United States Patent [19]

Watanabe et al.

[11] Patent Number: 4,731,667

[45] Date of Patent: Mar. 15, 1988

[54] IMAGE FORMING APPARATUS

[75] Inventors: Junji Watanabe; Ken Iseda, both of Yokohama, Japan

[73] Assignee: Kabushiki Kaisha Toshiba, Kawasaki, Japan

[21] Appl. No.: 883,722

[22] Filed: Jul. 9, 1986

[30] Foreign Application Priority Data

| Jul. 15, 1985 | [JP] | Japan | 60-155533 |
| Jul. 15, 1985 | [JP] | Japan | 60-155534 |
| Jul. 15, 1985 | [JP] | Japan | 60-155537 |
| Jul. 15, 1985 | [JP] | Japan | 60-155538 |
| Jul. 15, 1985 | [JP] | Japan | 60-155539 |
| Jul. 15, 1985 | [JP] | Japan | 60-155541 |
| Jul. 25, 1985 | [JP] | Japan | 60-162852 |

[51] Int. Cl.$^4$ .............................................. H04N 1/00
[52] U.S. Cl. ..................................... 358/256; 358/285; 358/286; 355/75
[58] Field of Search ............... 358/256, 257, 285, 286; 355/75

[56] References Cited

U.S. PATENT DOCUMENTS 4,449,152  5/1984  Kurata ................................ 358/286
4,652,937  3/1987  Shimura ............................. 358/256

Primary Examiner—Michael A. Masinick
Attorney, Agent, or Firm—Cushman, Darby & Cushman

[57] ABSTRACT

An image forming apparatus has a document table for placing a document thereon on the upper surface thereof. A scanner and a printer are provided in the apparatus. The scanner scans an image formed on the document placed on the document table. The printer forms an image based on the scanned data from the scanner. A document cover for covering the document placed on the document table is arranged on the upper portion of the apparatus. A keyboard unit is arranged on the upper surface of the document cover. An operator inputs operation data to the scanner and the printer through the keyboard unit.

4 Claims, 43 Drawing Figures

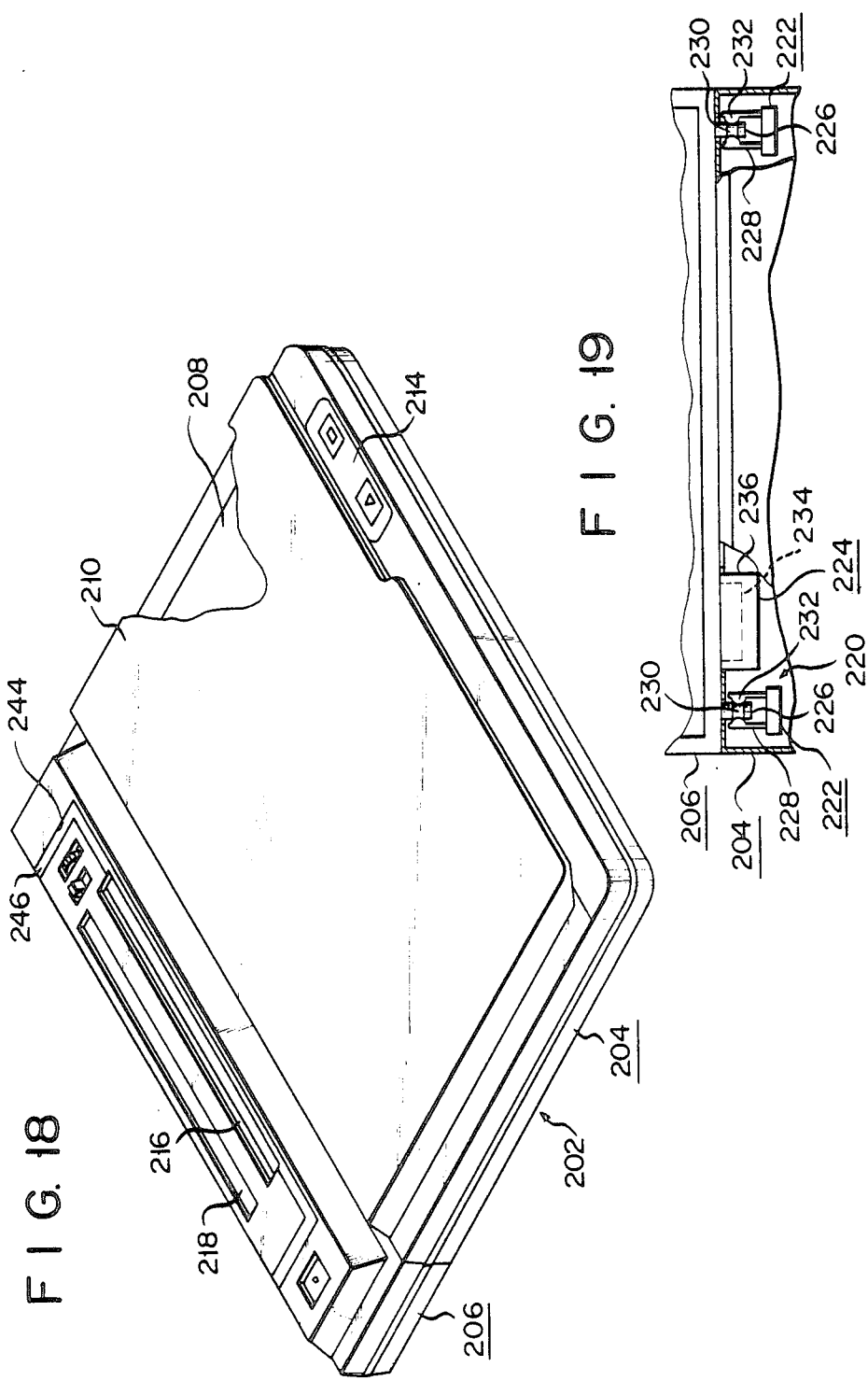

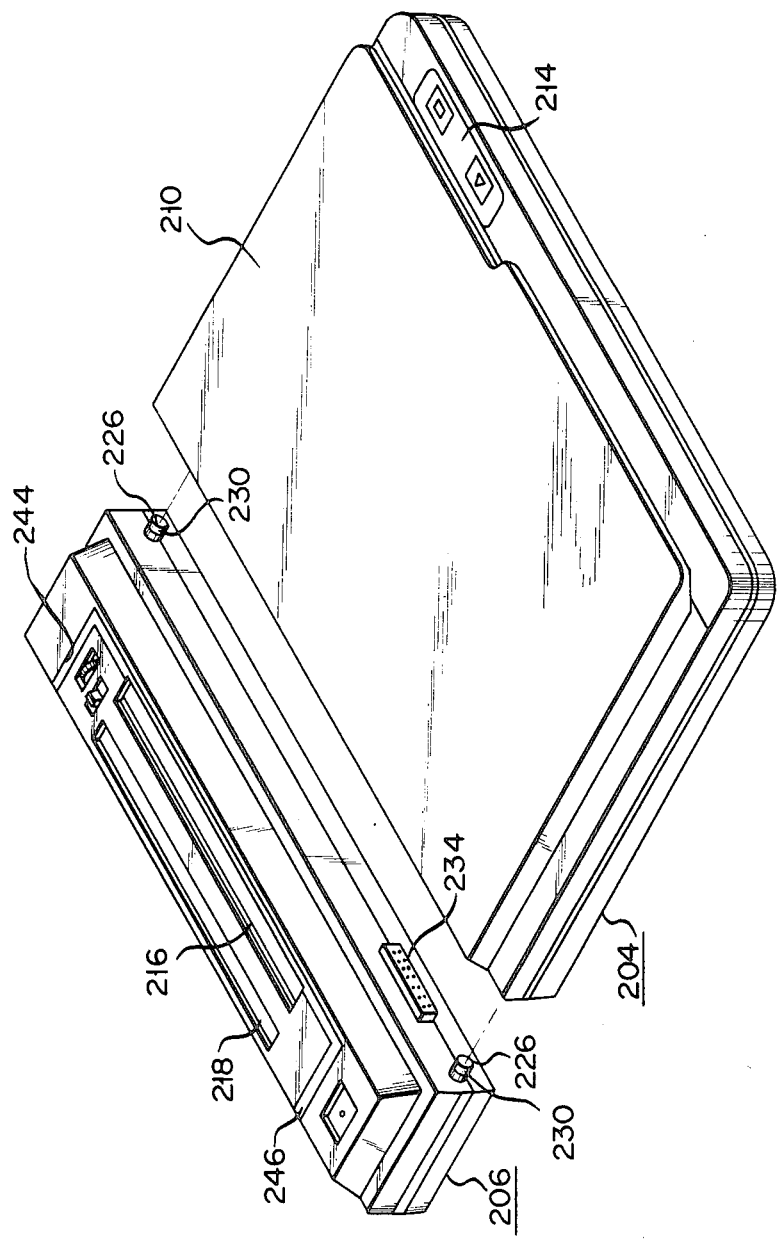

F I G. 29
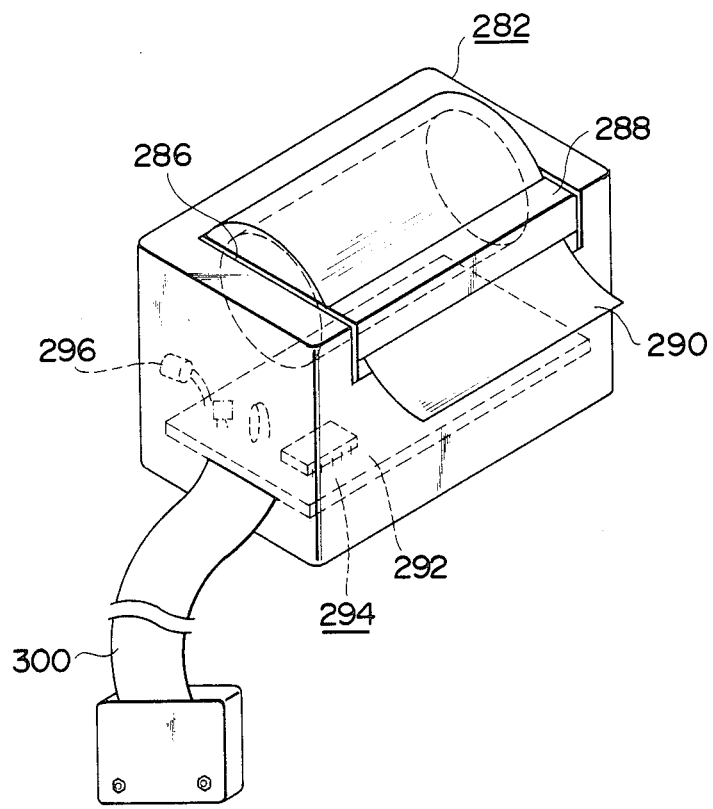

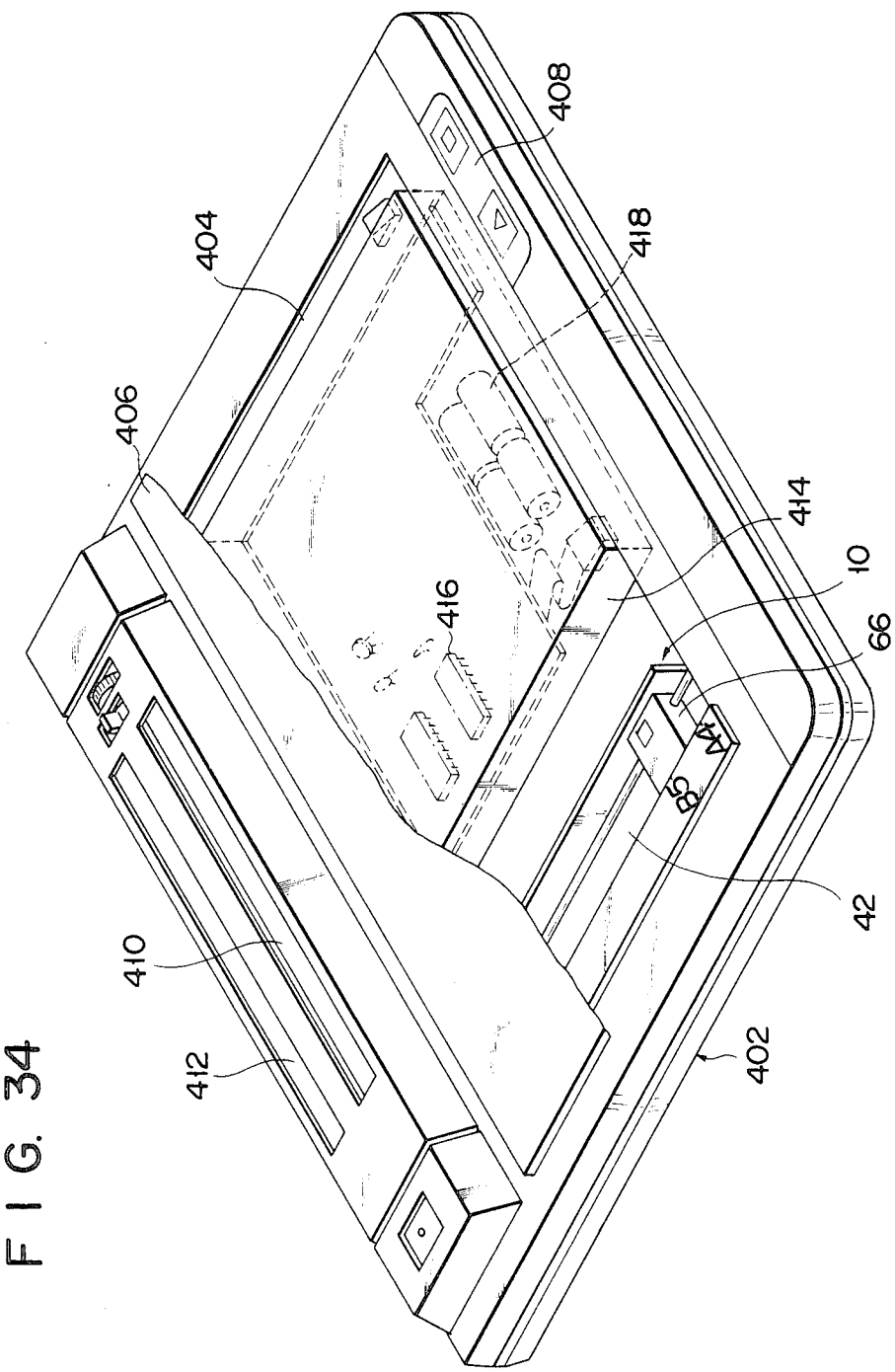
F I G. 34

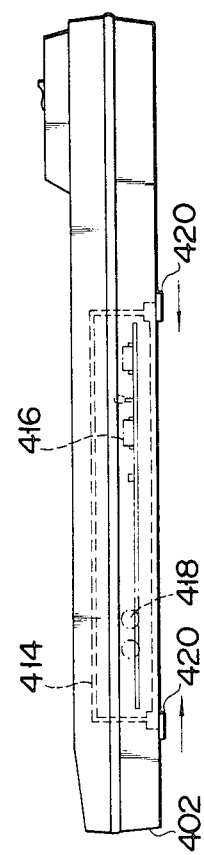
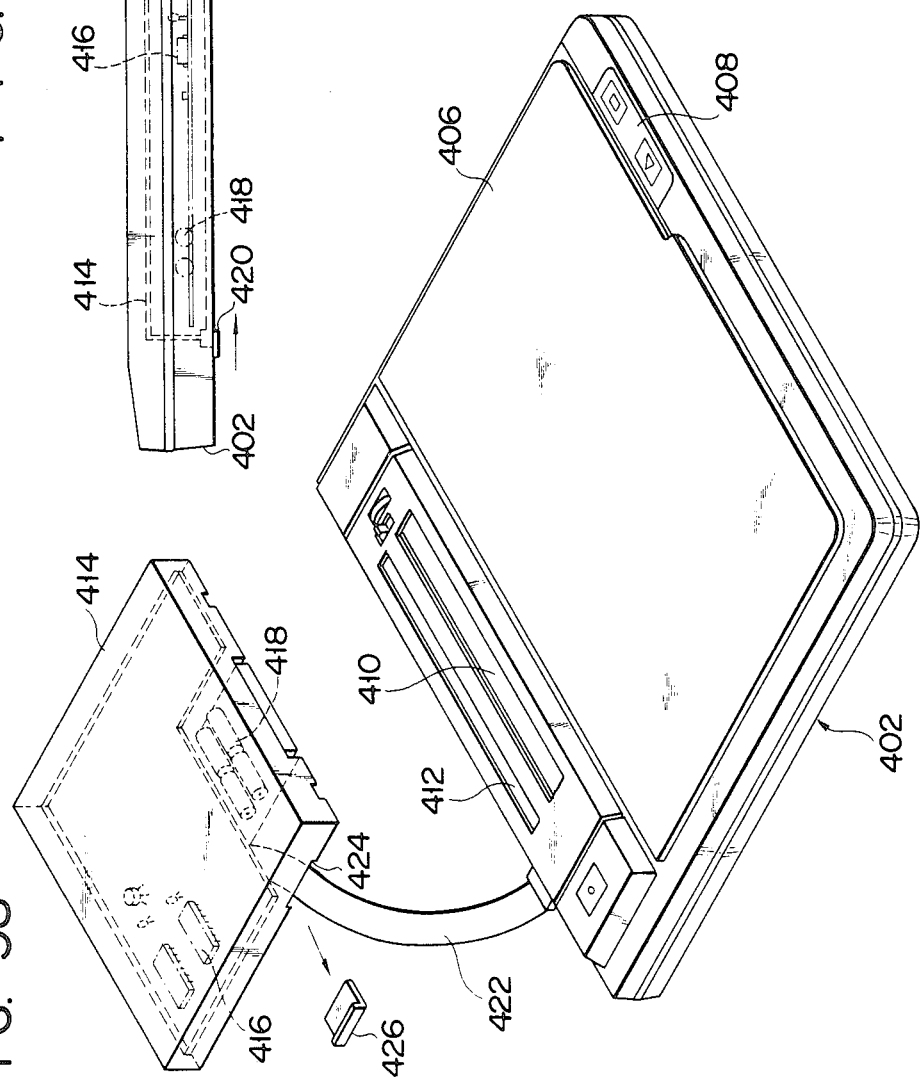

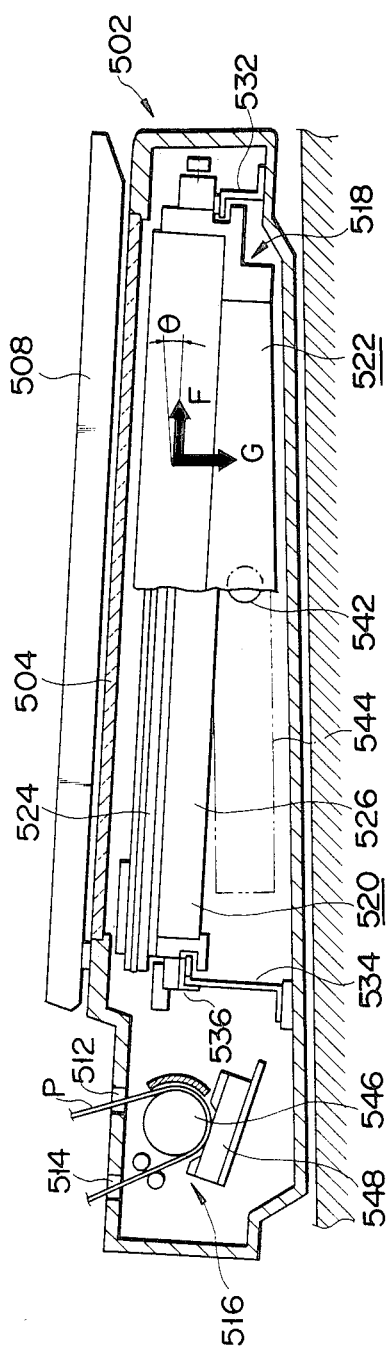
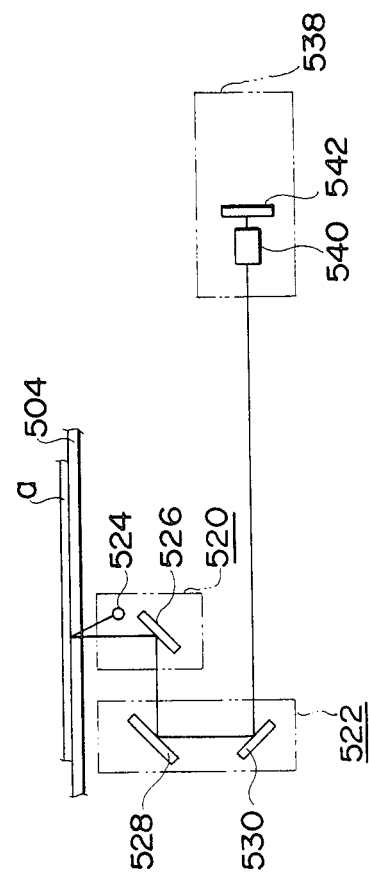
FIG. 42
FIG. 43

IMAGE FORMING APPARATUS

BACKGROUND OF THE INVENTION

The present invention relates to an image forming apparatus, e.g., a serial scanner printer.

In image forming apparatuses of this type, a document table is arranged on the upper surface of the apparatus, and a scanner and a printer are arranged inside the apparatus. A document placed on the document table is scanned by the scanner, and an image is formed by the printer in accordance with the scanned data.

In these apparatuses, a keyboard for operating the scanner and the printer is arranged in front of the document table and on the upper surface of the apparatus, thus requiring a special space therefor.

Since the scanner and the printer are arranged integrally, their positions cannot be changed, resulting in limited installation possibilities.

A power source for driving the scanner and the printer is housed in the bottom or rear portion of the apparatus, thus also requiring a special space therefor.

The above drawbacks interfere with any possible size reduction of the conventional apparatus.

SUMMARY OF THE INVENTION

It is an object of the present invention to provide a compact image forming apparatus.

According to one aspect of the invention, there is provided an image forming apparatus which comprises a document table for placing a document thereon, image scanning means for scanning an image formed on the document placed on said document table and outputting the scanned data, document cover means for covering the document placed on said document table, data input means, provided in said document cover means, for inputting predetermined data, and image forming means for forming an image on an image forming member in accordance with at least one of the input data from said data input means and the scanned data from said image scanning means.

According to the image forming apparatus of the present invention, since the data input means is arranged on the document cover means, a space for the data input means can be omitted, resulting in a compact apparatus.

According to another aspect of the invention, there is provided an image forming apparatus which comprises an image scanning unit having image scanning means for scanning an image formed on a document and outputting the scanned data, an image forming unit having image forming means for forming an image based on the scanned data from said image scanning means, and coupling means for mechanically and electrically coupling said image scanning unit and said image forming unit to be detachable from each other.

According to the image forming apparatus of the present invention, since the image scanning unit and the image forming unit can be separated, this increases the installation possibilities of the apparatus, and reduces the size of the apparatus.

According to a further aspect of the invention, there is provided an image forming apparatus which comprises a document table for placing a document thereon, image scanning means for scanning an image formed on the document placed on said document table and outputting the scanned data, said image scanning means consisting of imaging means for sensing the image formed on the document, moving means for moving said imaging means, and a moving area of said imaging means, image forming means for forming an image based on the scanned data from said image scanning means, and a power source for driving said image scanning means and said image forming means, said power source being housed within the moving area when said image scanning means is not used and being removed from the moving area to be used when said image scanning means is used.

According to the image forming apparatus of the present invention, since the power source is housed within the moving area of the imaging means, a special space for the power source is not needed, resulting in a compact apparatus.

BRIEF DESCRIPTION OF THE DRAWINGS

FIGS. 1 to 17 show a first embodiment of the present invention, in which: FIG. 1 is a perspective view of a scanner printer, FIG. 2 is a partially cutaway side view of the scanner printer in FIG. 1, FIG. 3 is a perspective view of the internal structure of the scanner printer in FIG. 1, FIG. 4 is a plan view showing a drive mechanism, FIG. 5 is a longitudinal sectional front view showing a sensor unit, FIG. 6 is a plan view of the sensor unit shown in FIG. 5, FIG. 7 is a longitudinal sectional side view of the sensor unit shown in FIG. 5, FIG. 8 is a plan view showing a scanning width, FIG. 9 is a plan view for explaining a scanning order, FIG. 10 is a perspective view of a printer, FIG. 11 is a front view of a thermal head, FIG. 12 is a side view of the thermal head in FIG.a 11, FIG. 13 is a block diagram of a control circuit, FIG. 14 is a flow chart of image formation, FIGS. 15 and 16 show a modification of the first embodiment, in which FIG. 15 is a perspective view of a scanner printer, and FIG. 16 is a partially cutaway side view of the scanner printer shown in FIG. 15, and FIG. 17 is a perspective view of another modification of the first embodiment;

FIGS. 18 to 33 show a second embodiment of the present invention, in which:

FIG. 18 is a perspective view of a scanner printer,

FIG. 19 is a plan view showing a coupling mechanism,

FIG. 20 is a perspective view showing a state wherein a main body is divided into a scanner unit and a printer unit, FIG. 21 is a perspective view showing a state wherein the main body is divided into the scanner unit and the printer unit, and they are connected through a coupling cord, FIG. 22 is a perspective view showing a printed circuit board housed in a document cover, FIG. 23 is a side-sectional view of FIG. 22, FIG. 24 is a perspective view showing a state wherein a cassette is mounted on a main body, FIG. 25 is a perspective view showing the cassette, FIG. 26 is a sectional view showing a state wherein the cassette is mounted on the main body, FIG. 27 is a perspective view of a modification of the second embodiment showing a state wherein a main body is divided into a scanner unit and a printer unit and they are stored in an attaché case, FIGS. 28 to 33 show another modification of the second embodiment, in which FIG. 28 is a perspective view showing a state wherein a television monitor and an additional unit are connected to the main body, FIG.

29 is a perspective view showing the additional unit, FIG. 30 is a perspective view showing a positioning guide, FIG. 31 is a perspective view showing the relationship between the width of roll paper and the image formation width of the printer, FIG. 32 is a block diagram of an interface circuit, and FIG. 33 is a flow chart of image formation; and FIGS. 34 to 43 show a third embodiment of the present invention, in which:

FIG. 34 is a perspective view showing a state wherein a detachable unit is housed in a main body, FIG. 35 is a plan view of the state shown in FIG. 34, FIG. 36 is a front view of the state shown in FIG. 34, FIG. 37 is a side view of the state shown in FIG. 34, FIG. 38 is a perspective view showing a state wherein the detachable unit is detached from the main body, and FIGS. 39 to 43 show a modification of the third embodiment, in which FIG. 39 is a perspective view showing a scanner printer, FIG. 40 is a perspective view showing a scanner printer which opens a document cover, FIG. 41 is a side view of the scanner printer, FIG. 42 is a sectional view showing an internal arrangement, and FIG. 43 is an illustration showing the arrangement of the scanner.

DETAILED DESCRIPTION OF THE PREFERRED EMBODIMENTS

A first embodiment of the present invention will now be described with reference to FIGS. 1 to 17.

Figure 1:
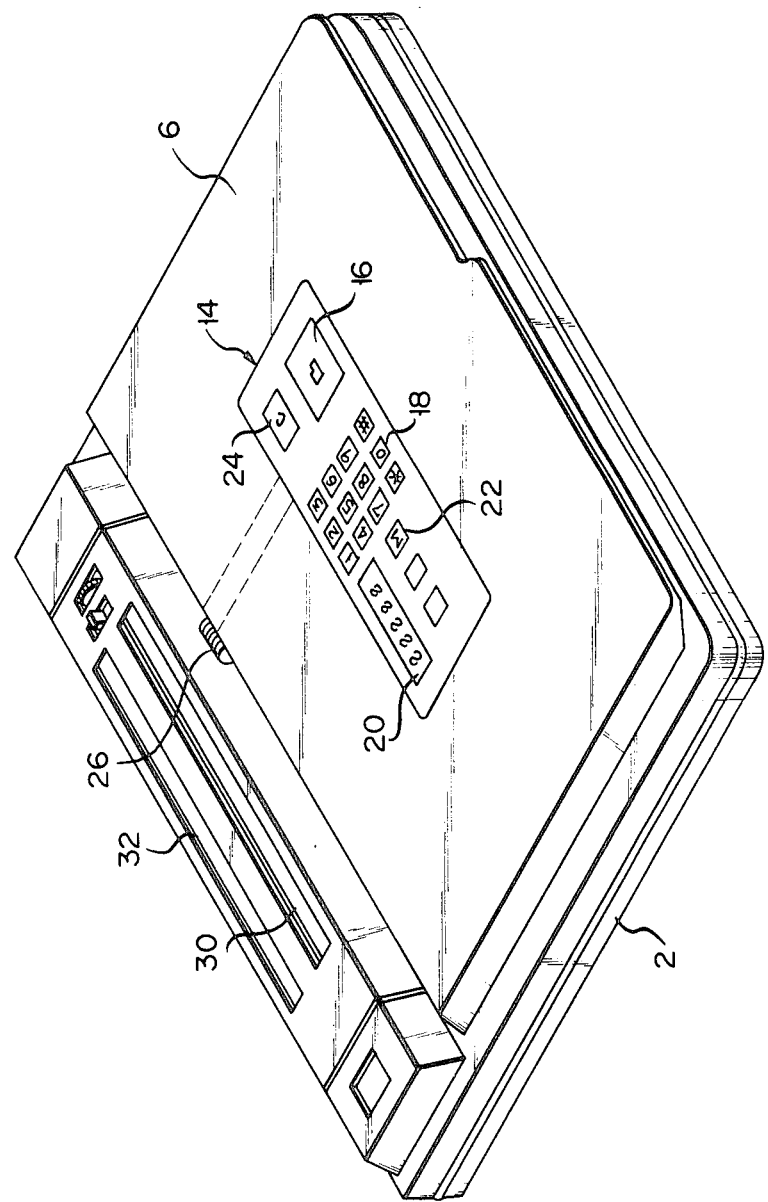
Figure 2:
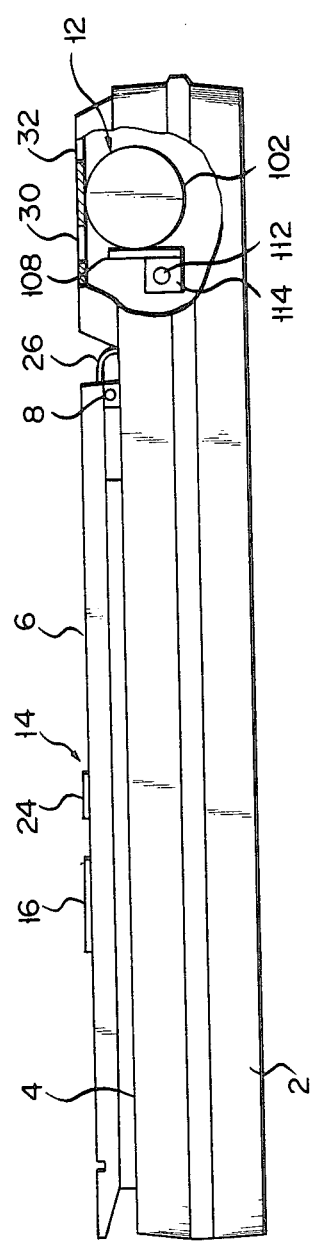

Referring to FIGS. 1 and 2, reference numeral 2 denotes a main body of a serial scanner printer as an image forming apparatus according to the present invention. Document table (transparent glass) 4 is arranged on the upper surface portion of main body 2, and document cover 6 is arranged on table 4. The rear portion of document cover 6 is axially supported by shaft 8 to be freely opened or closed with respect to table 4.

Keyboard unit 14 for operating scanner 10, printer 12, and the like is arranged on the upper surface portion of cover 6. Keyboard unit 14 comprises copy start key 16 for starting a copying operation, ten keys 18 for setting a copying number, display section 20 for displaying the copying number, density setting mode key 22, clear key 24 and the like, and is formed to be a flat panel. Since cover 6 is pivoted about shaft 8, keyboard unit 14 is connected to CPU 28 (to be described later) in main body 2 through flexible cable 26.

Inlet port 30 and outlet port 32 for paper sheets (e.g., heat sensitive sheets) for printer 12 (to be described later) are formed in the upper rear surface of main body 2.

Figure 3:
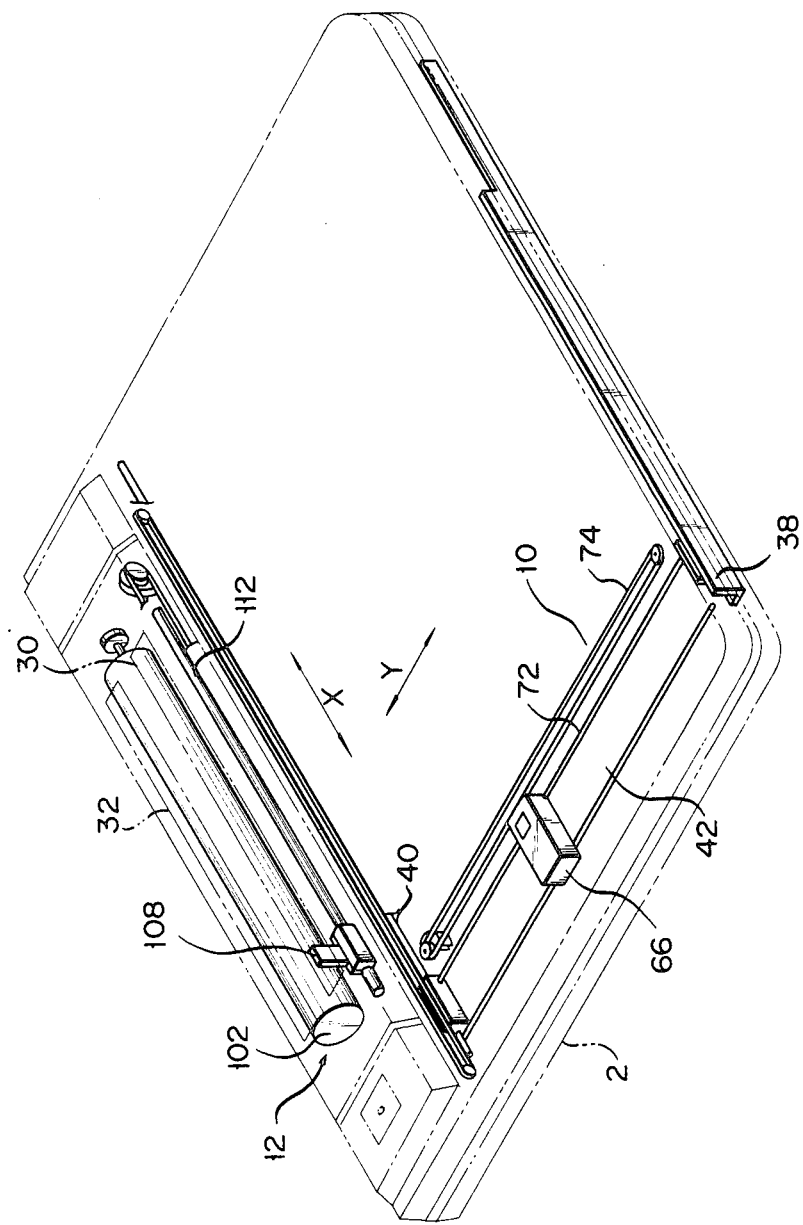

Main body 2 includes scanner 10 for scanning an image formed on a document placed on table 4, and printer 12 for forming an image on a paper sheet in accordance with scanned data from scanner 10, as shown in FIG. 3. Scanner 10 is located below table 4, and printer 12 is located behind scanner 10.

Scanner 10 comprises sensor unit 34 and drive mechanism 36. Sensor unit 34 senses document a placed on document table 4. Drive mechanism 36 reciprocates sensor unit 34 in the right-and-left direction (X direction) and the back-and-forth direction (Y direction).

Figure 4:
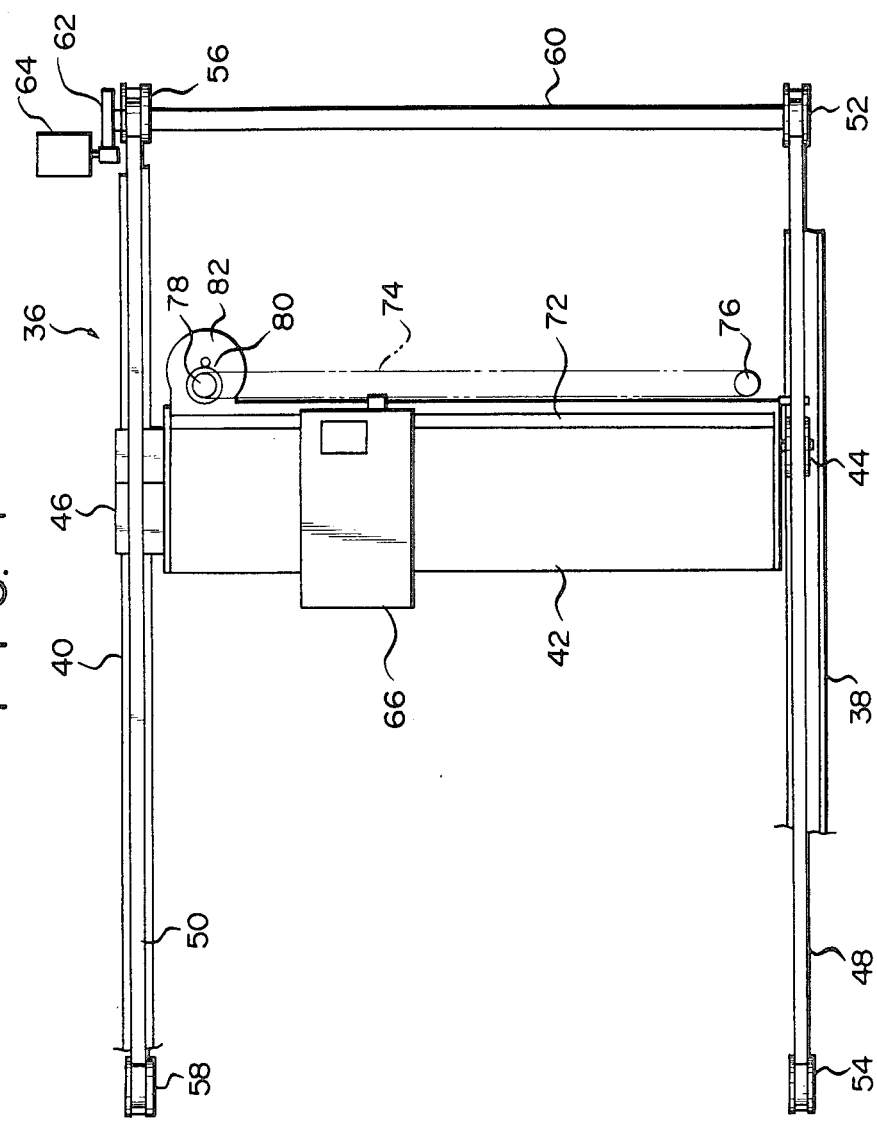

Drive mechanism 36 has guide rail 38 and guide shaft 40, as shown in FIG. 4. Guide rail 38 and guide shaft 40 are arranged to extend along the X direction. Guide rail 38 is arranged at the front side of scanner 10 in main body 2, and guide shaft 40 is arranged at the rear side thereof. First carriage 42 extends between guide rail 38 and guide shaft 40. First carriage 42 has roller 44 at its front side, and slider 46 at its rear side. Roller 44 is rotatable along guide rail 38, and slider 46 is slidably supported by guide shaft 40. Thereby, first carriage 42 is movable in the X direction. Timing belts 48 and 50 are coupled to the front and rear sides of first carriage 42, respectively. Timing belt 48 at the front side is looped between pulley 52 arranged near the right end of guide rail 38 and pulley 54 arranged near the left end thereof. Timing belt 50 at the rear side is looped between pulley 56 arranged near the right end of guide shaft 40 and pulley 58 arranged near the left end thereof. Pulleys 52 and 56 are mounted on the both ends of shaft 60. Shaft 60 is driven by first pulse motor 64 through reduction gears 62. First carriage 42 reciprocates along the X direction upon operation of first pulse motor 64.

Figure 5:
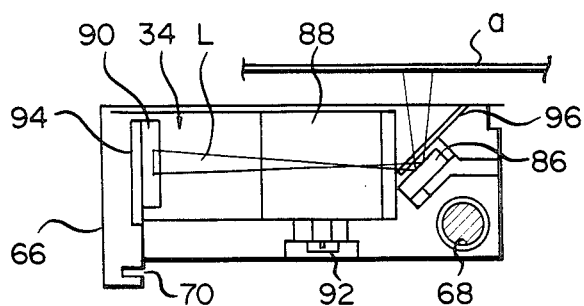
Figure 6:
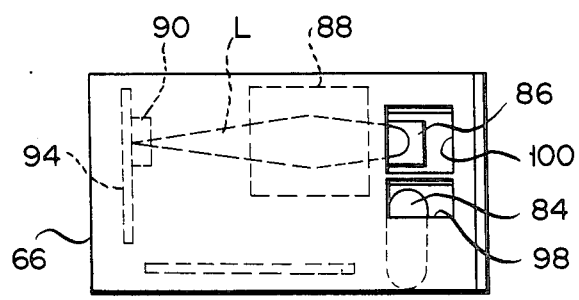
Figure 7:
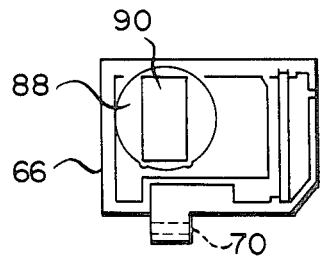

Second carriage 66 is supported by first carriage 42. Second carriage 66 has through hole 68 in its right portion, and recess portion 70 in its left portion, as shown in FIG. 5. Shaft 72 is slidably inserted in through hole 68, and is arranged on first carriage 42 along the Y direction. Recess portion 70 is slidably supported by the edge of first carriage 42. Thus, second carriage 66 is movable along the Y direction.

Timing belt 74 is coupled to the right end portion of second carriage 66. Timing belt 74 is looped between a pair of pulleys 76 and 78 arranged on the front and rear sides of first carriage 42. Pulley 78 at the rear side is driven by second pulse motor 82 through reduction gears 80. Second carriage 66 reciprocates along the Y direction upon operation of second pulse motor 82.

Sensor unit 34 is arranged in second carriage 66, and has lamp 84, mirror 86, lens 88, and image sensor 90. Light L emitted from lamp 84 illuminates document a, and light L reflected thereby is guided onto image sensor 90, sequentially, through mirror 86 and lens 88.

Note that reference numeral 92 denotes a focusing screw. When screw 92 is operated, lens 88 is moved along its optical axis. Reference numeral 94 denotes an amplifier circuit board for image sensor 90. Image sensor 90 is mounted directly on circuit board 94 in order to eliminate the influence of noise. Reference numeral 96 denotes a mirror support for supporting mirror 86; 98, a window through which light L propagating from lamp 84 toward document a passes; and 100, a window through which light L propagating from document a toward mirror 86 passes.

Figure 8:
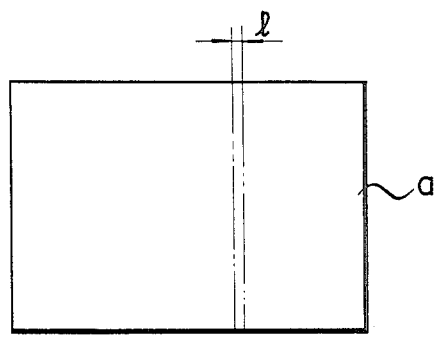

Image sensor 90 is a plural-bit image sensor, and drive mechanism 36 moves first carriage 42 by a pitch shorter than a width corresponding to the number of bits of image sensor 90. Therefore, as shown in FIG. 8, a 1-line document image is scanned by plural-bit width 1 of image sensor 90.

Figure 9:
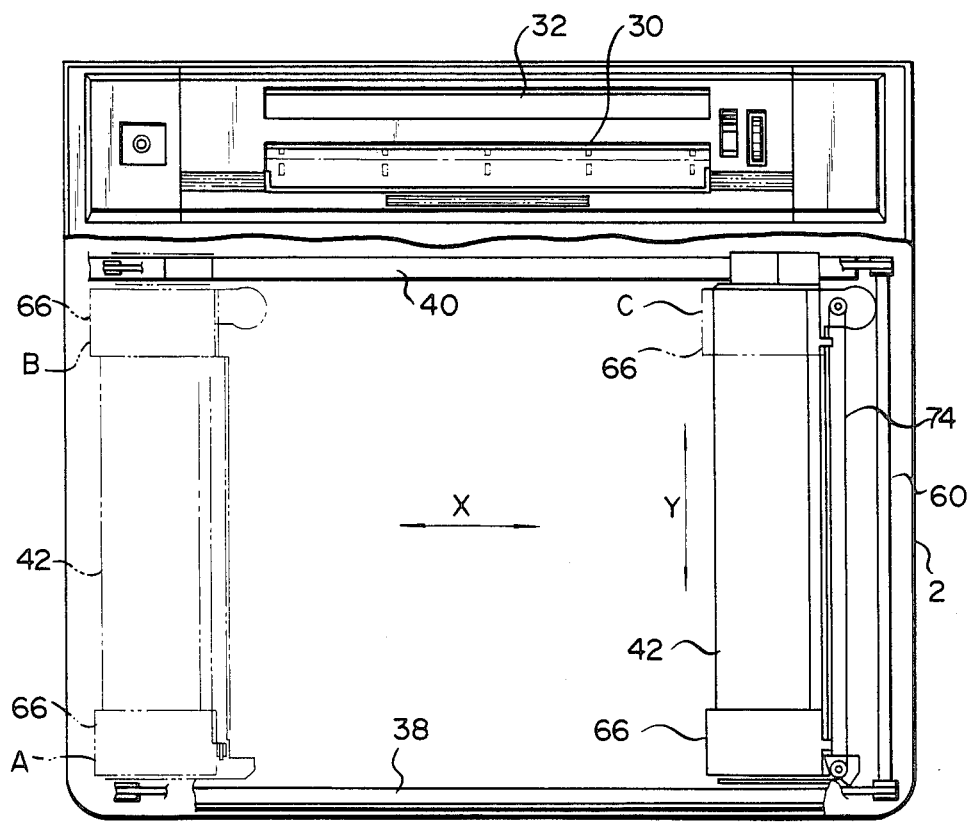

As shown in FIG. 9, sensor unit 34 starts scanning from position A at the front left side, and scans an image while moving along the Y direction toward the rear side. When unit 34 reaches position B at the rear side, it is then immediately returned to the front side. During this operation, unit 34 is shifted to the right by 1-line scanning width l. This operation is repeated until unit 34 reaches position C at the rear right side.

Figure 10:
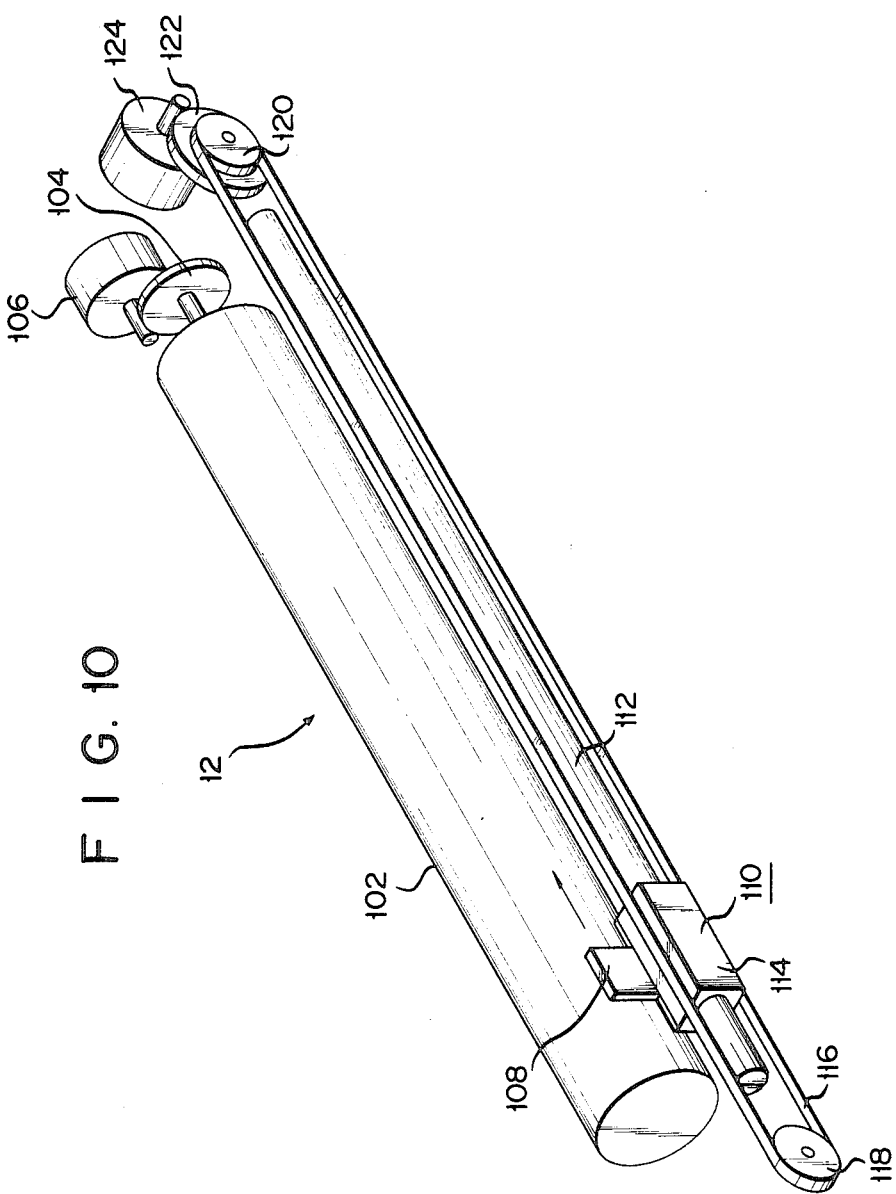
Figure 11:
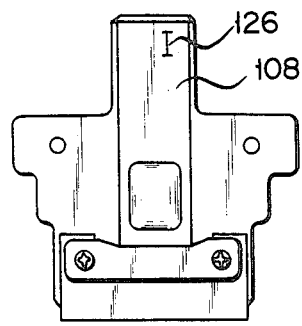
Figure 12:
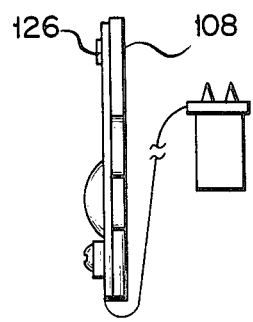

Printer 12 has platen 102 for supporting and conveying a paper sheet, as shown in FIG. 10. Platen 102 is driven by third pulse motor 106 through reduction gears 104 by a predetermined pitch. Thermal head 108 faces platen 102, and is moved by head moving mechanism 110 along the axial direction of platen 102. More specifically, head moving mechanism 110 has shaft 112 parallel to platen 102, and slider 114 is slidably supported by shaft 112. Slider 114 is coupled to timing belt 116. Timing belt 116 is looped between a pair of pulleys 118 and 120 arranged near the both ends of shaft 112. Pulley 120 is driven by fourth pulse motor 124 through reduction gears 122. Thermal head 108 is mounted on slider 114. Thus, thermal head 108 is movable along the axial direction of platen 102 upon operation of fourth pulse motor 124. As shown in FIGS. 11 and 12, heating members 126 of thermal head 108 are aligned along a direction perpendicular to the axial direction of platen 102, i.e., along the rotating direction of platen 102.

The printing operation of thermal head 108 follows the scanning operation of scanner 10, and is performed at the same speed as that of the scanning operation. A print width corresponds to scanning width l of scanner 10. In addition, a paper guide and a paper press roller (neither are shown) are arranged near platen 102.

Figure 13:
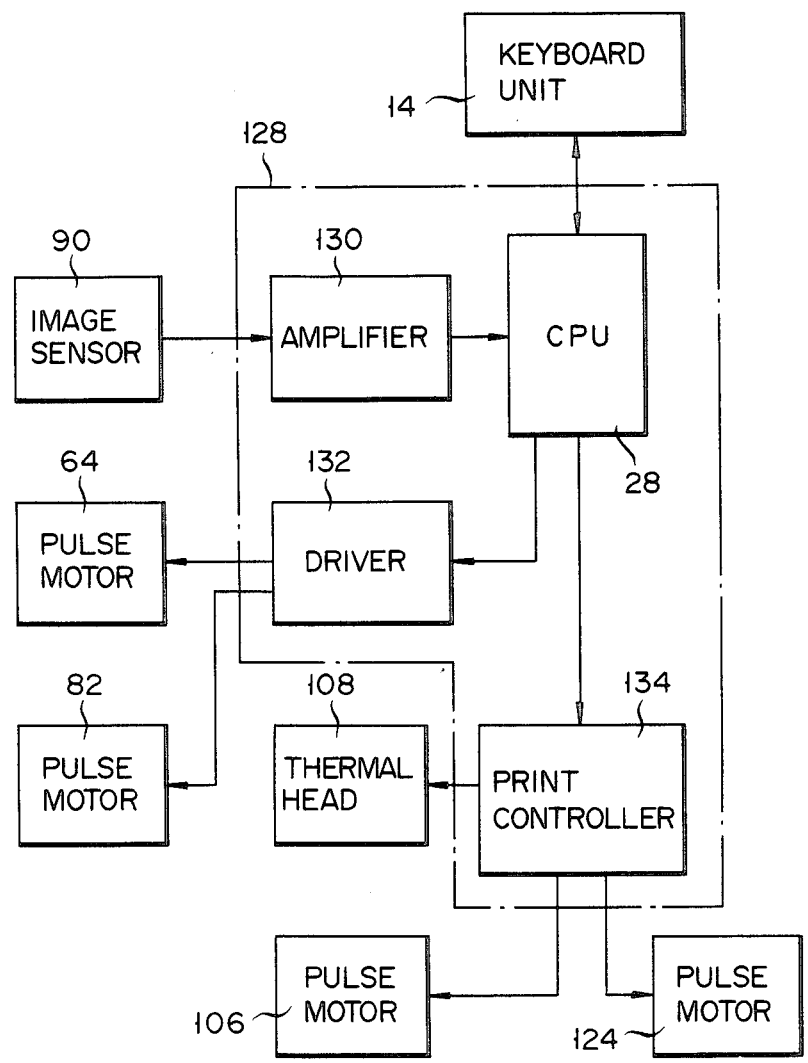
Figure 14:
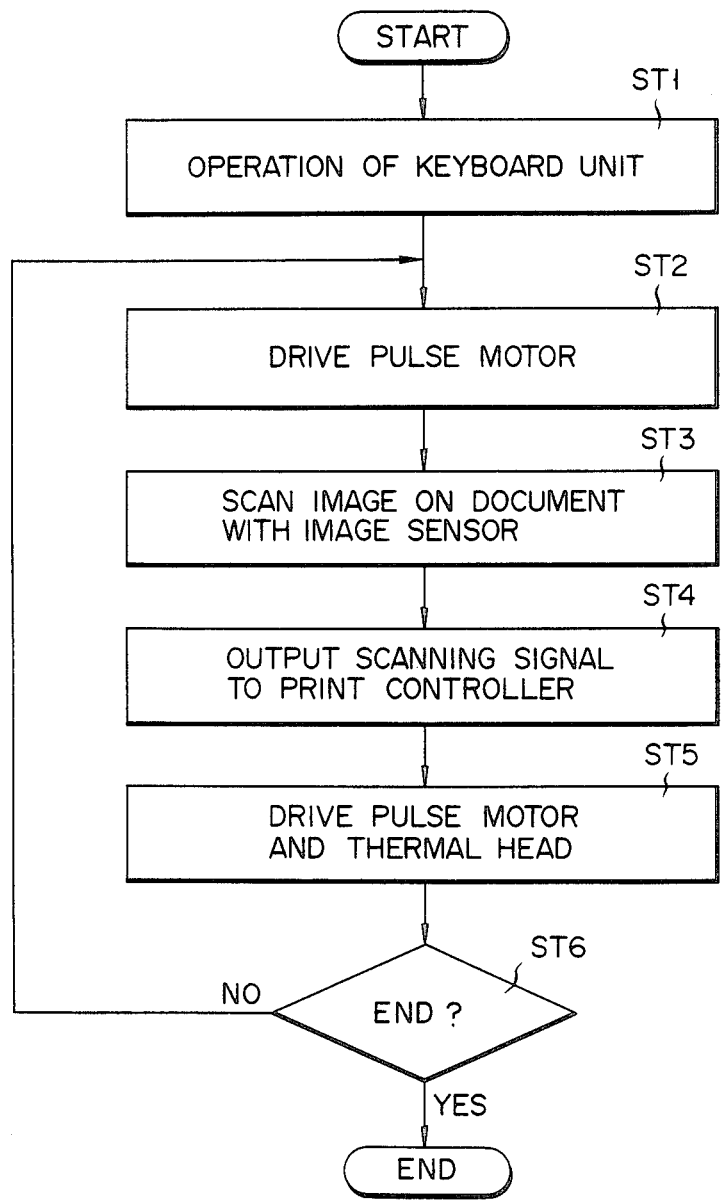

Referring to FIG. 13, reference numeral 128 denotes a control circuit of this apparatus. Control circuit 128 comprises CPU (Central Processing Unit) 28 for controlling the entire apparatus, amplifier 130 for amplifying the output from image sensor 90 and supplying it to CPU 28, driver 132 for driving pulse motors 64 and 82 in accordance with a signal from CPU 28, and print controller 134 for controlling thermal head 108 and pulse motors 106 and 124 in accordance with the signal from CPU 28. Referring to FIG. 14, when an operator depresses one or more of the ten keys 18 and copy start key 16, a copy number setting signal and a copy start signal are supplied to CPU 28 (ST1). CPU 28 controls driver 132 in accordance with these signals, and driver 132 drives pulse motors 64 and 82 under the control of CPU 28 (ST2). Next, image sensor 90 starts the document scanning operation (ST3). Image data output from image sensor 90 is supplied to CPU 28 through amplifier 130, and CPU 28 supplies this image data to print controller 134 (ST4). Print controller 134 drives pulse motors 106 and 124 and thermal head 108 in accordance with the image data from CPU 28, thereby forming an image corresponding to the image data (ST5). If image formation has not been performed a preset number of times, the flow returns to step ST2, and image formation is performed again. If the image formation has been performed the preset number of times, the operation is completed (ST6).

With the above arrangement, since keyboard unit 14 is arranged on the upper surface of document cover 6, a special space for keyboard unit 14 can be omitted. Therefore, a compact apparatus can be provided.

Figure 15:
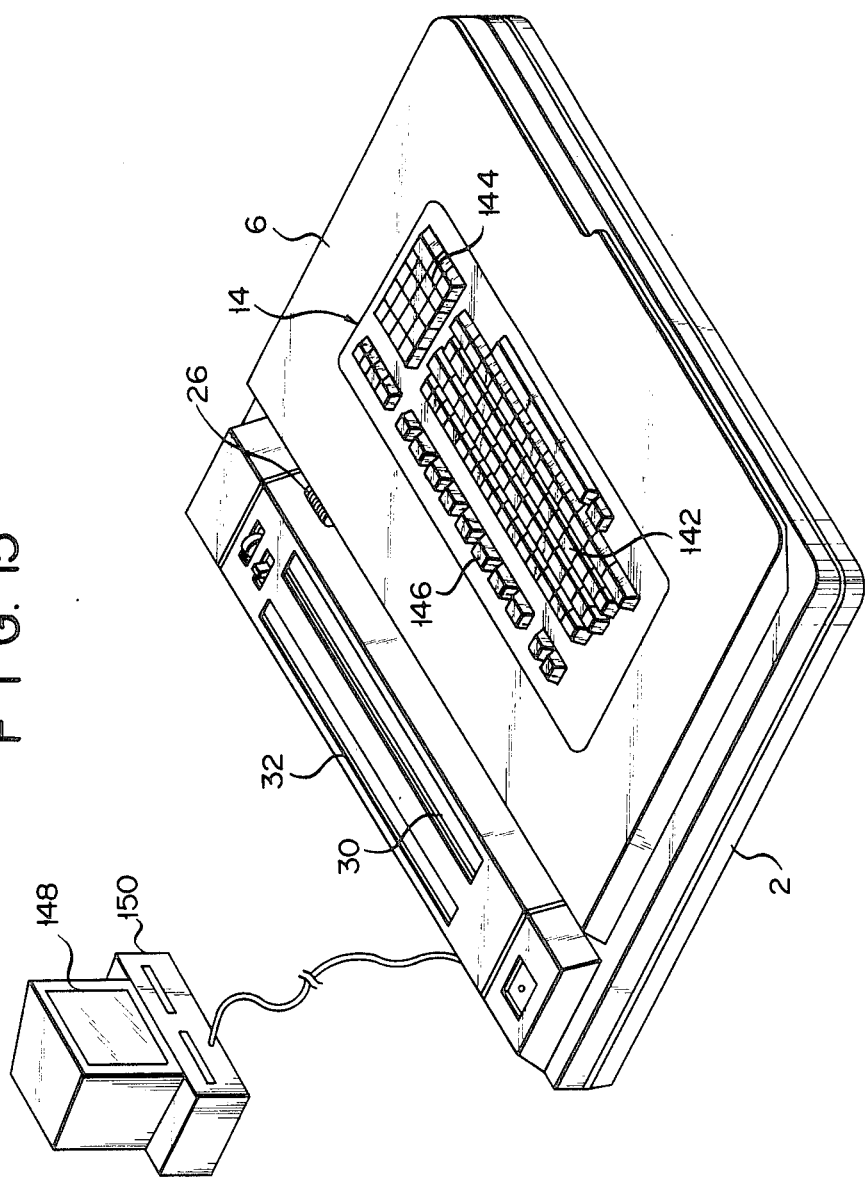
Figure 16:
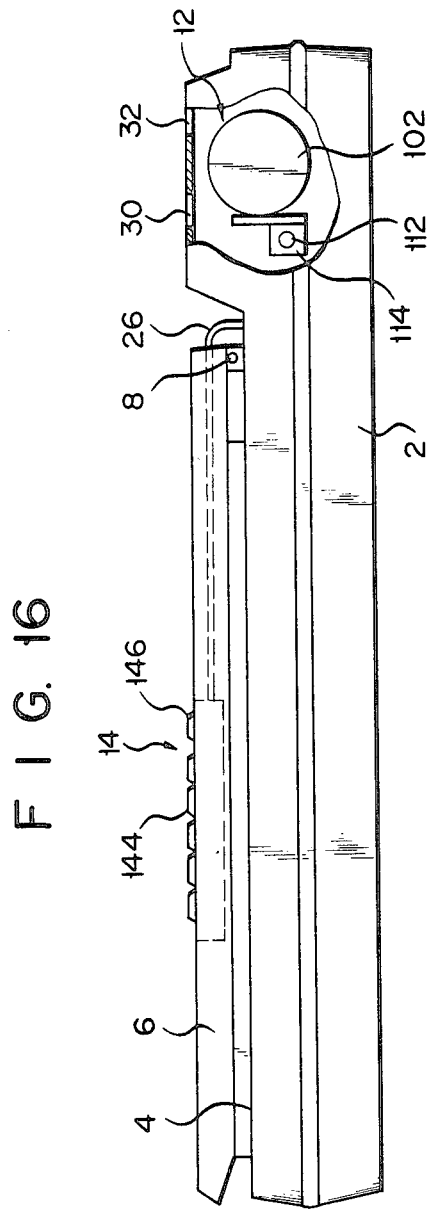

FIGS. 15 and 16 show a modification of keyboard unit 14. In this modification, keyboard unit 14 has a keyboard for a personal computer, which includes character keys 142, ten keys 144, function keys 146, and the like. With this arrangement, when this apparatus is connected to CRT display 148 and floppy disk device 150, it can serve as an input/output apparatus for a personal computer, in which keyboard unit 14, printer 12, and scanner 10 are integrally arranged. Therefore, since a keyboard for the personal computer need not be separately provided, the system can be compact.

Figure 17:
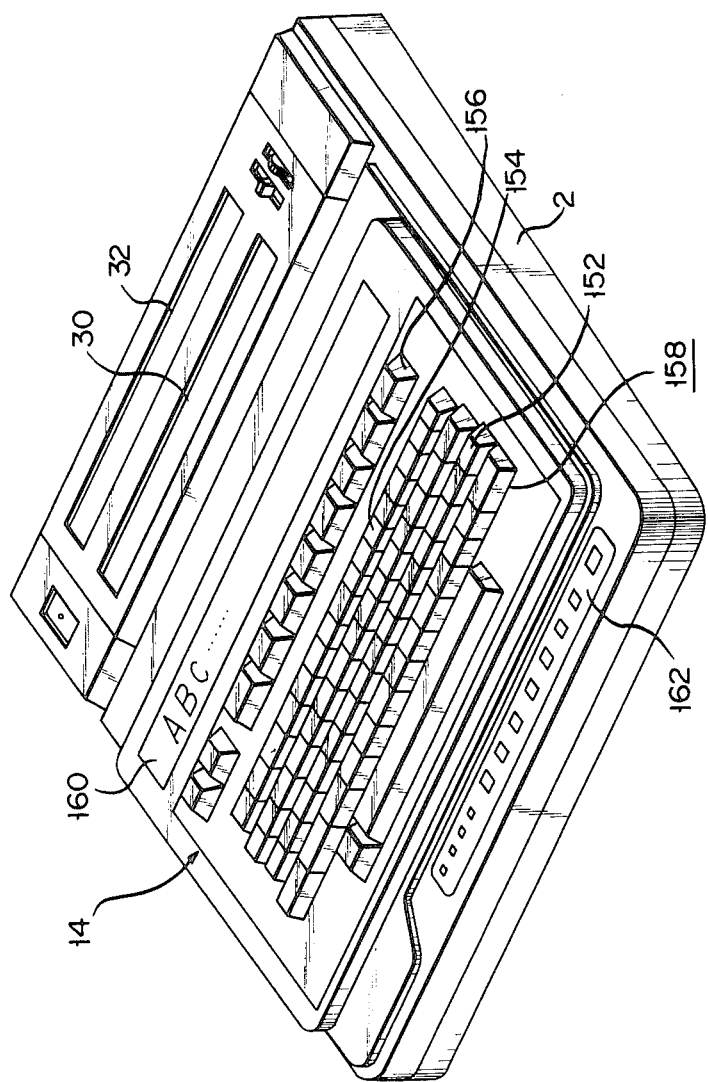

FIG. 17 shows another modification of keyboard unit 14. Keyboard unit 14 of this modification has keyboard 158 consisting of character keys 152, ten keys 154, function keys 156, and the like, and display section 160 for displaying data input through keyboard 158. With this arrangement, the apparatus of the present invention can be used as a wordprocessor or a typewriter. Note that in this modification, operation panel 162 for inputting copy operation data is arranged on the upper front surface of main body 2.

Next, a second embodiment of the present invention will be described with reference to FIGS. 18 to 33.

Referring to FIG. 18, reference numeral 202 denotes a main body of a serial scanner printer as an image forming apparatus according to the present invention. Main body 202 comprises scanner unit 204 incorporating scanner 10, and printer unit 206 incorporating printer 12.

Document table (transparent glass) 208 for placing a document thereon is arranged on the upper surface portion of scanner unit 204. Document cover 210 is arranged on document table 208. The rear portion of document cover 210 is axially supported by shaft 212 (FIG. 23) to be pivotable thereabout. Document cover 210 is openable and closeable with respect to document table 208. Operation panel 214 for performing a copying operation is arranged on the front upper surface of scanner unit 204.

Inlet port 216 and outlet port 218 for paper sheets (e.g., heat sensitive sheets) for printer 12 are formed in the upper rear surface of printer unit 206.

Figure 21:
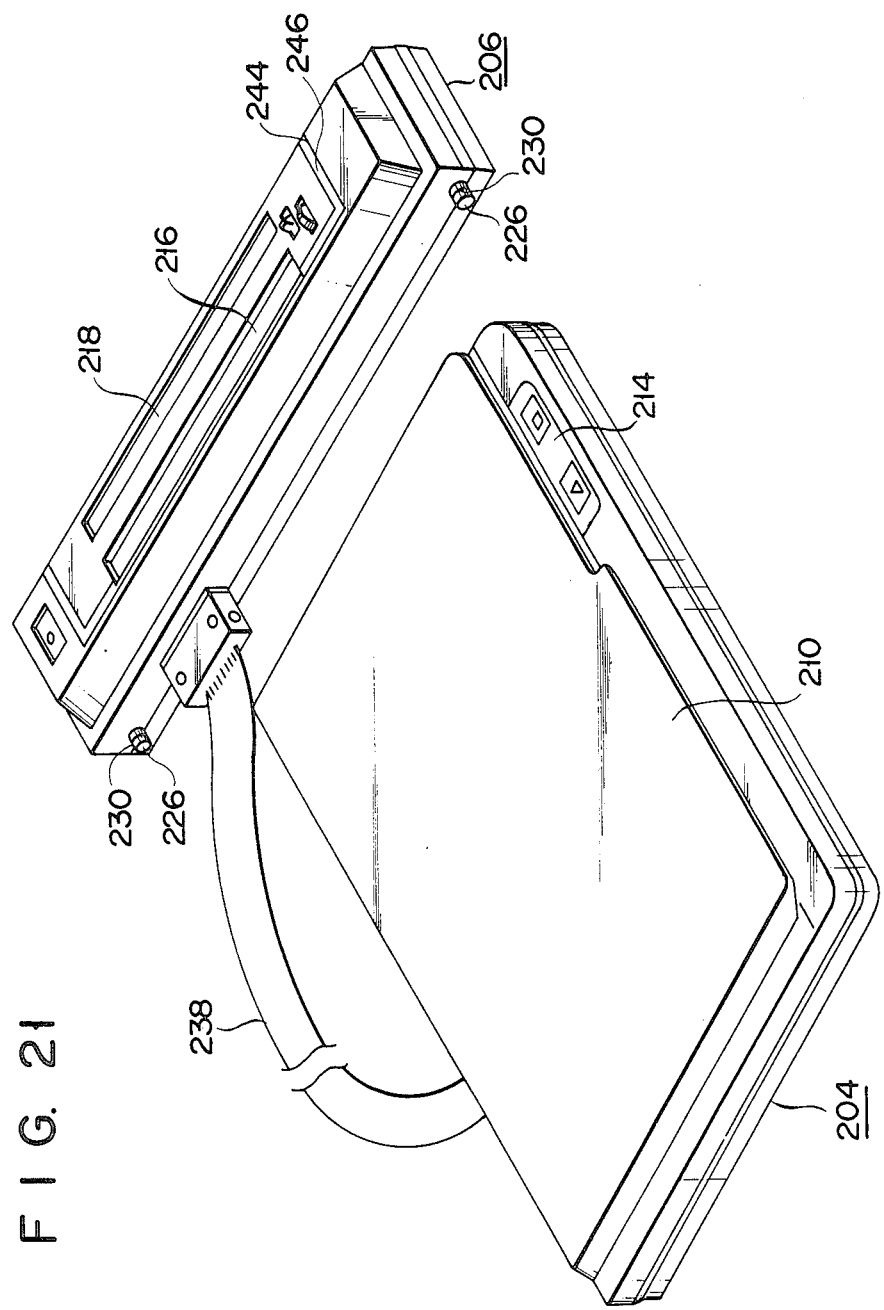

Scanner unit 204 and printer unit 206 are coupled by coupling mechanism 220 to be separable from each other, as shown in FIGS. 19 and 20. More specifically, coupling mechanism 220 has mechanical coupling mechanisms 222 and electrical coupling mechanism 224. Mechanical coupling mechanisms 222 mechanically couple scanner unit 204 and printer unit 206, and have coupling pins 226 and reception members 228. Pins 226 project at the front side of printer unit 206, and have annular recesses 230 therearound. Reception members 228 are arranged at the rear side of scanner unit 206. Each reception member 228 comprises a spring member for elastically clamping the corresponding coupling pin 226, and has projection 232 at its distal end portion, which is engaged with recess 230 of coupling pin 226. Electrical coupling mechanism 224 electrically couples scanner unit 204 and printer unit 206, and has a pair of connectors 234 and 236. Connector 234 is arranged on the front side of printer unit 206, and connector 236 is arranged on the rear side of scanner unit 204. The coupling operation of mechanism 224 is performed simultaneously with that of mechanisms 222. As shown in FIG. 21, when connectors 234 and 236 are coupled by coupling cord 238, scanner unit 204 and printer unit 206 can be used in a separated state.

Figure 22:
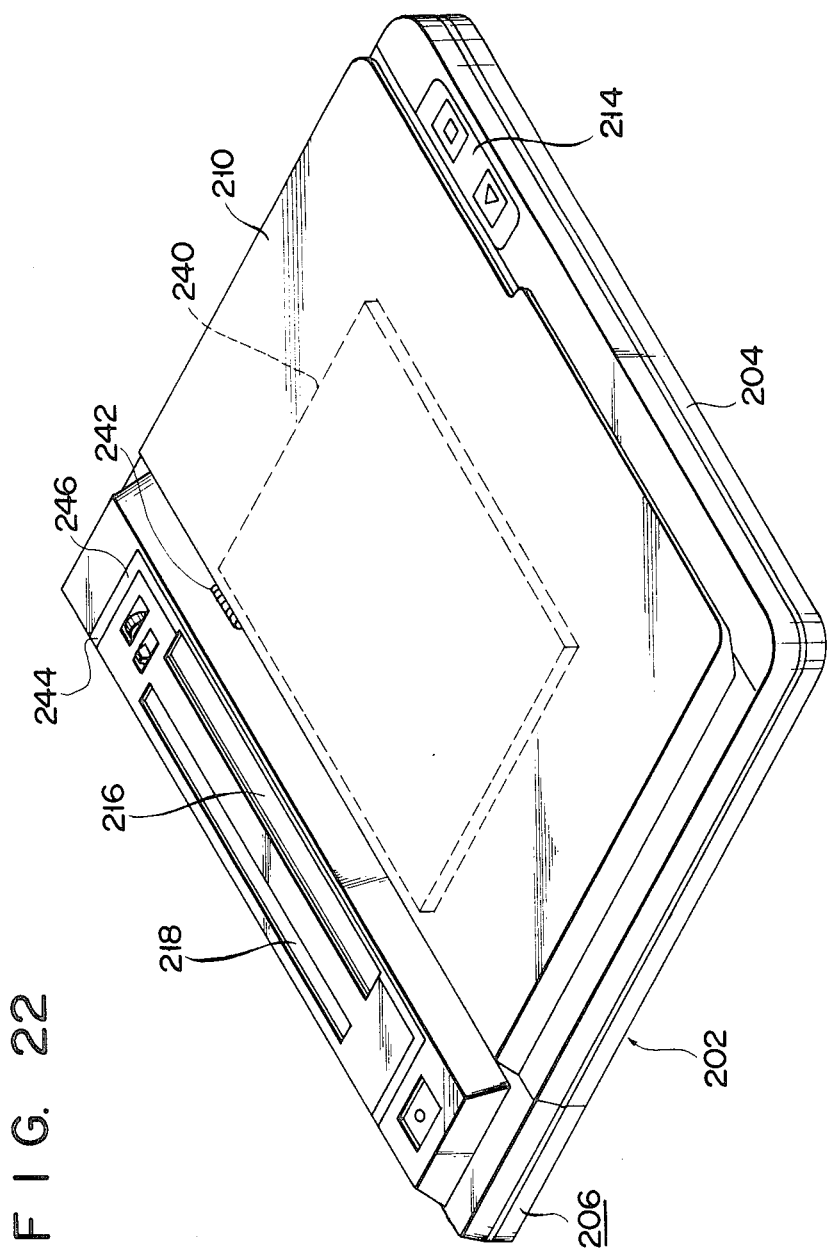
Figure 23:
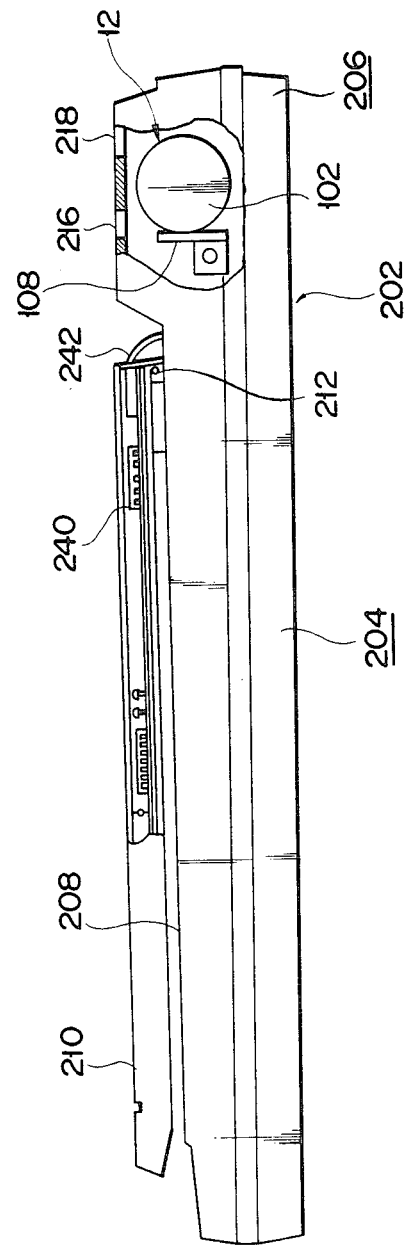

Document cover 210 incorporates printed circuit board 240 for control circuit 128, as shown in FIGS. 22 and 23. Since document cover 210 is pivoted about shaft 212 as a fulcrum, control circuit 128 is connected to various devices in main body 202 through flexible cable 242.

Figure 24:
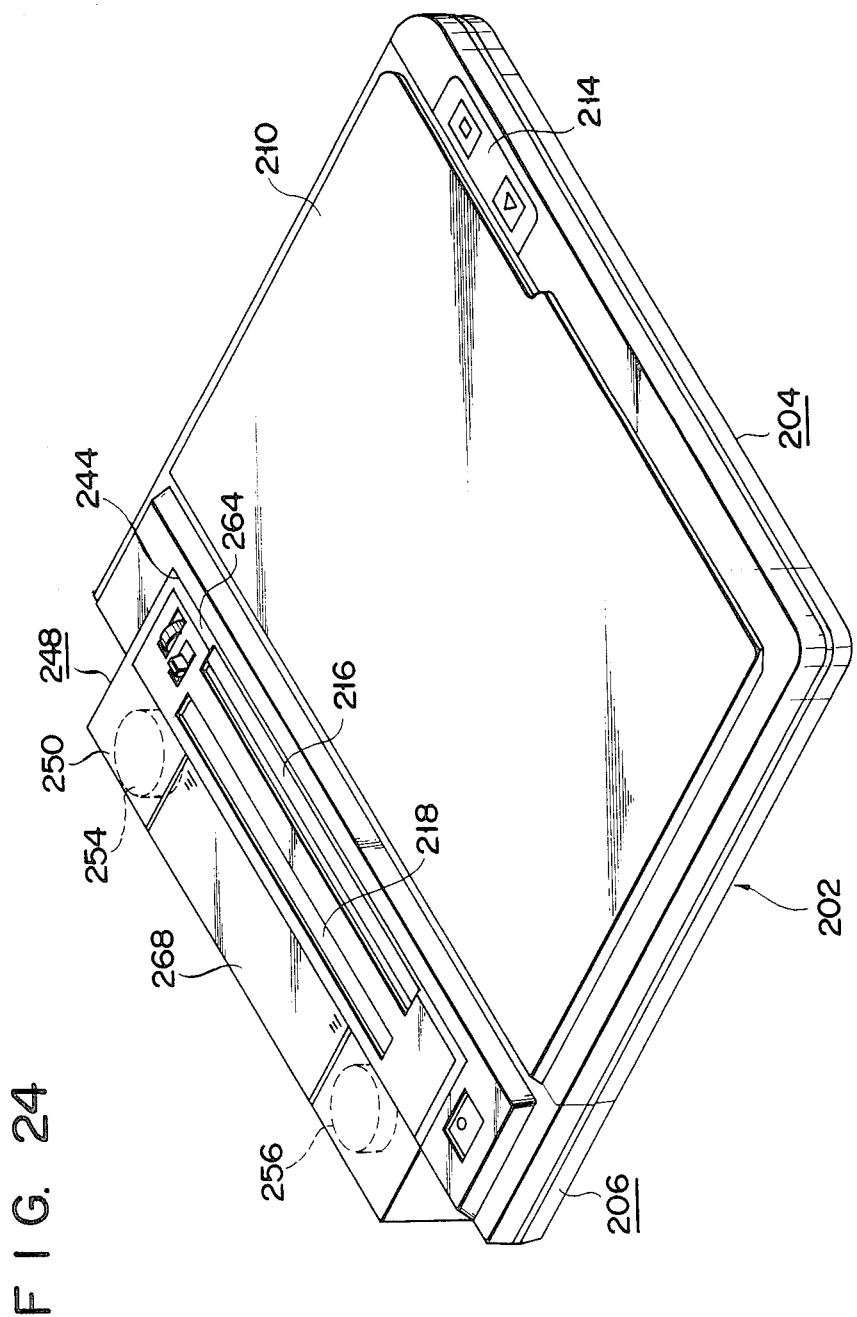
Figure 25:
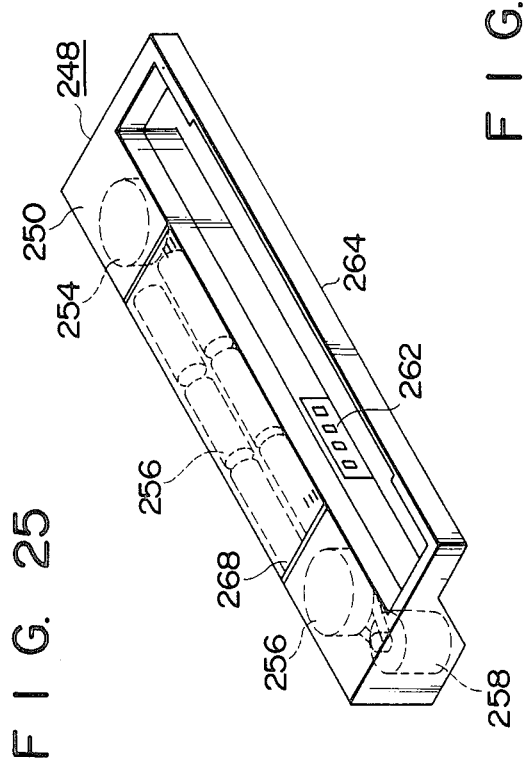

As shown in FIGS. 18 and 24, U-shaped cassette mounting groove 244, open to the upper and back surfaces of printer unit 206, is formed in printer unit 206. When an image is to be formed on a paper sheet such as a heat sensitive sheet, lid 246 is fitted in groove 244. When an image is to be formed on a regular paper sheet, lid 246 is removed, and cassette 248 is mounted. More specifically, cassette 248 has cassette case 250, as shown in FIG. 25, and case 250 houses thermal transfer ribbon 252, supply roller 254 for supplying ribbon 252, takeup roller 256 for winding ribbon 252, drive motor 258 for driving roller 256, and power source (dry cells or battery) 260 for motor 258.

Figure 26:
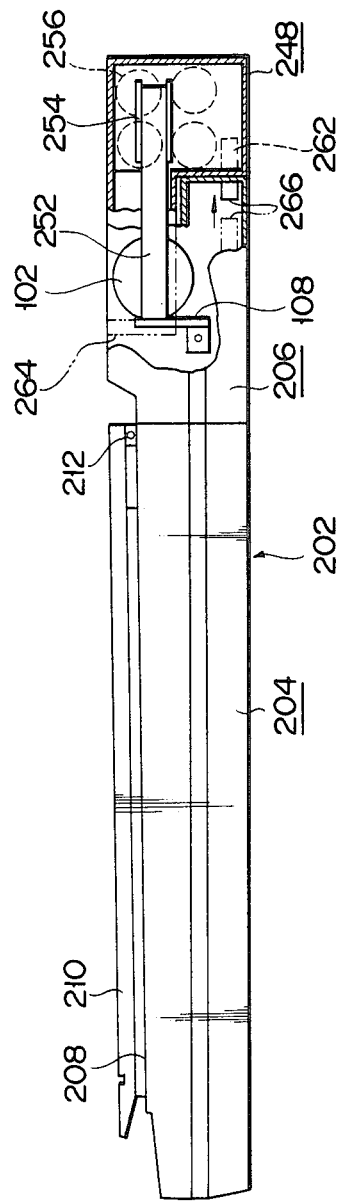

Case 250 is provided with connecting terminal 262 and guide arm 264. Guide arm 264 has a shape which allows it to be fitted in groove 244, and guides ribbon 252 supplied from roller 254 and taken up by roller 256. In addition, ribbon 252 can be exposed midway along guide arm 264. As shown in FIG. 26, when guide arm 264 is fitted in groove 244, cassette 248 is mounted on the outer rear portion of printer unit 206. In this state, ribbon 252 is interposed between platen 102 and thermal head 108, and rollers 254 and 256 of cassette 248 are located outside printer unit 206. Note that connecting terminal 262 of cassette 248 is connected to connecting terminal 266 of main body 202. In addition, reference numeral 268 denotes a door which is opened or closed when power source 260 is exchanged.

With the above arrangement, since main body 202 can be separated into scanner unit 204 and printer unit 206, the arrangements of scanner unit 204 and printer unit 206 can be changed as desired. Therefore, installation margin of the apparatus increases, providing a compact apparatus. In addition, this apparatus can be easily connected to other OA (office automation) equipment, and can be easily installed.

Since printed circuit board 240 is housed in document cover 210, the height of main body 202 can be reduced. In addition, since printed circuit board 240 has a uniform thickness, it can be easily housed in cover 210, resulting a compact arrangement.

Image formation onto a heat sensitive sheet is performed by removing cassette 248 from main body 202, and image formation onto a regular paper sheet is performed by mounting cassette 248 outside main body 202. Therefore, the space for cassette 248 can be omitted from main body 202, and the size of the apparatus can be reduced. Since cassette 248 is mounted outside main body 202, a storage amount of ribbon 252 can be increased without changing the size of main body 202. Since motor 258 for driving ribbon 252, and power source 260 therefor, are housed in cassette 248, a driving force need not be transmitted from main body 202 to cassette 248. As a result, the drive mechanism of main body 202 can be simplified. Moveover, since electrical power need not be supplied from main body 202 to cassette 248, the capacity of the power source (not shown) of main body 202 can be reduced.

Figure 27:
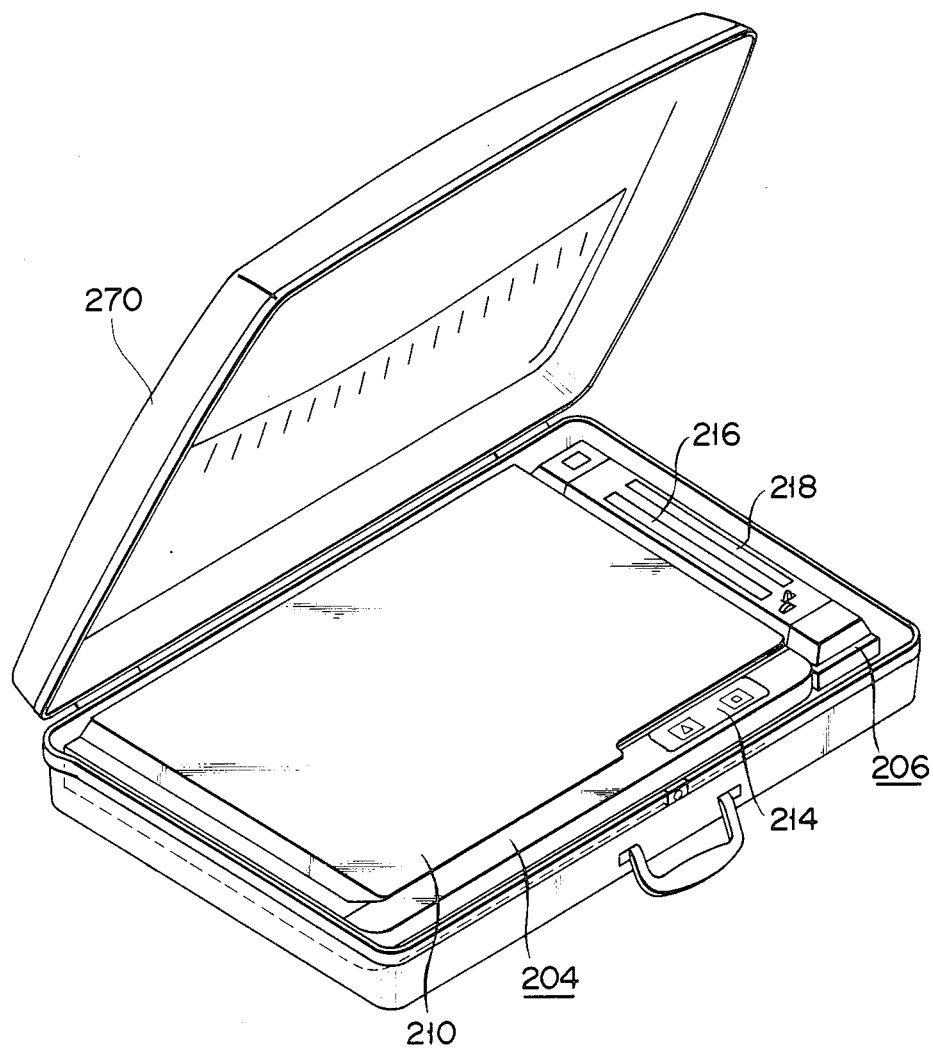

FIG. 27 shows a modification of printer unit 206. In this modification, the size of printer unit 206 in the right-and-left direction is the same as that of scanner unit 204 in the back-and-forth direction. Thus, units 204 and 206 can be easily stored in general-purpose attaché case 270, resulting in convenience and portability.

Figure 28:
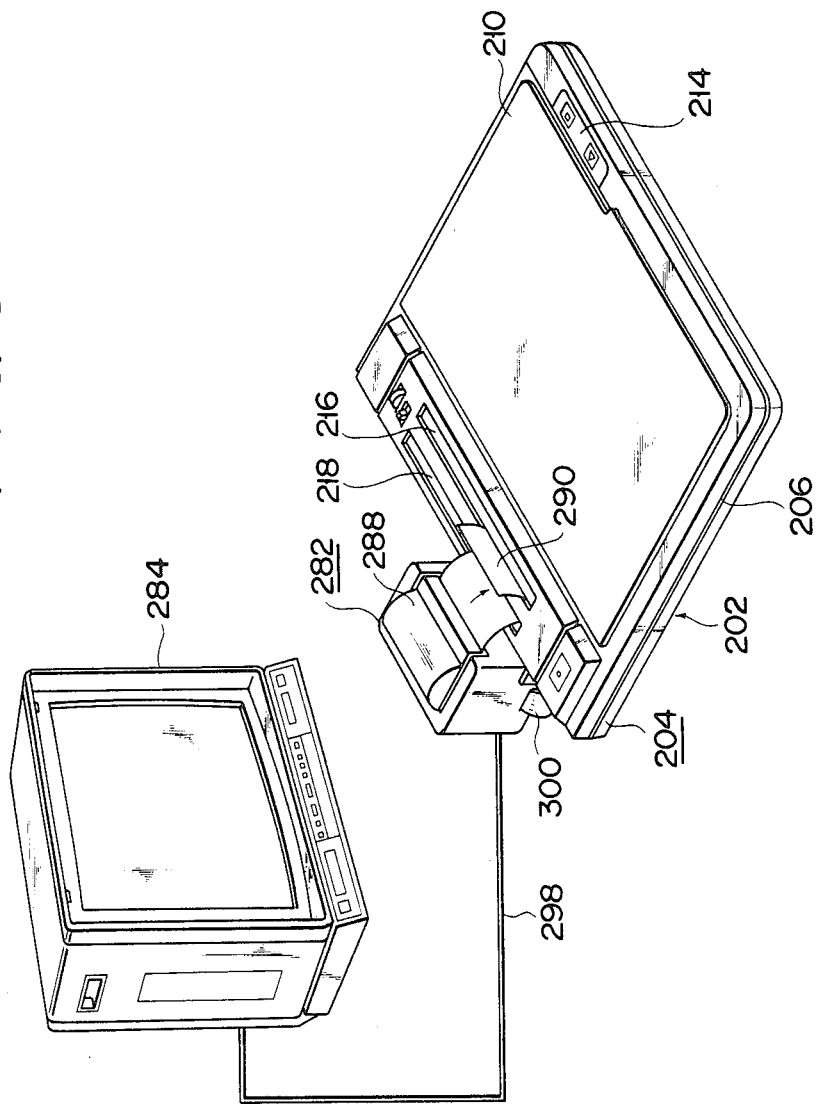

FIGS. 28 to 33 show another modification of printer unit 204. In this modification, additional unit 282 can be mounted on printer unit 204, as shown in FIG. 28. Additional unit 282 is mounted on unit 204 when image data from television monitor 284 is to be printed. As shown in FIGS. 28 and 29, opening 286 is formed in additional unit 282, and is opened or closed by lid 288. A paper sheet (e.g., heat sensitive sheet) wound in the form of a roll, i.e., roll sheet 290, is held in additional unit 282 to be supplied therefrom. Additional unit 282 has circuit board 292, which constitutes interface circuit 294 for outputting a video signal from television monitor 284 to printer 12. Input terminal 296 of interface circuit 294 is arranged on the back surface of additional unit 282, and is connected to connecting cable 298 extending from television monitor 284. In addition, connecting cable 300 to be connected to printer 12 extends from additional unit 282.

Figure 30:
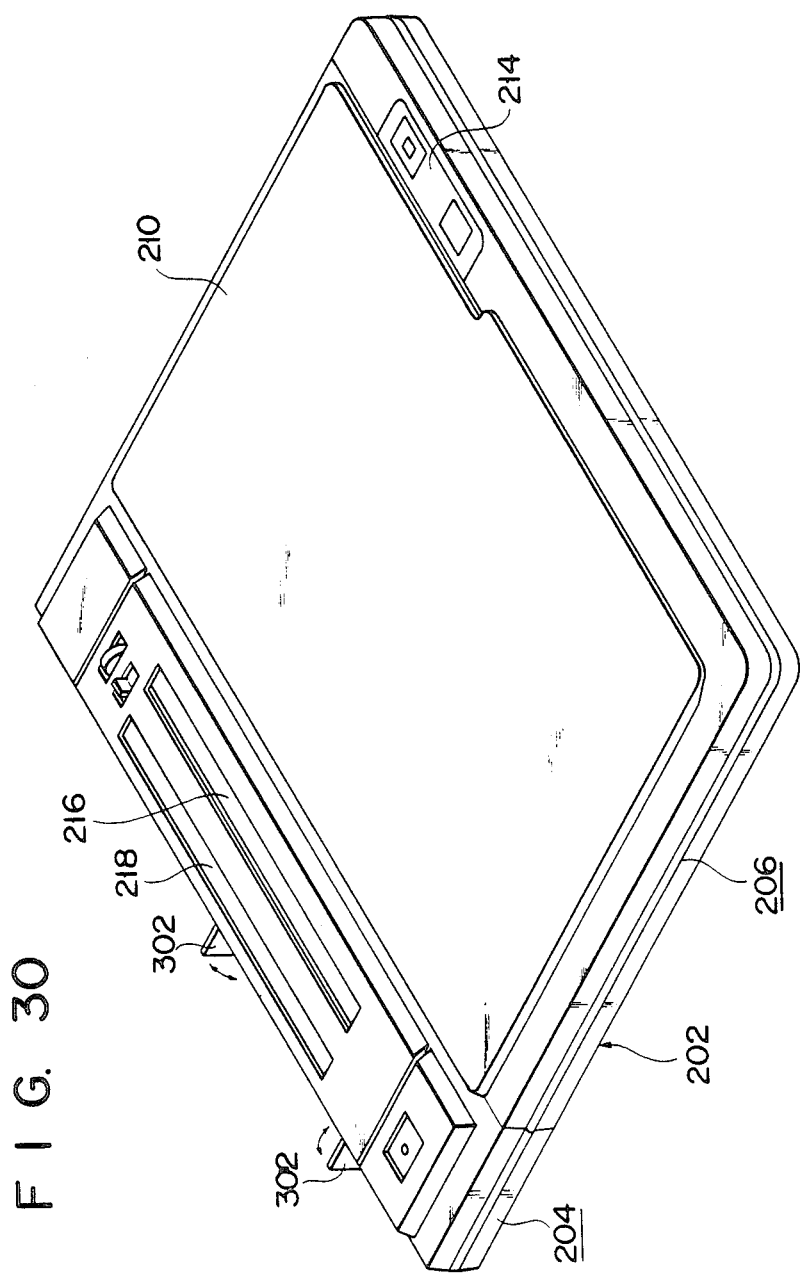
Figure 31:
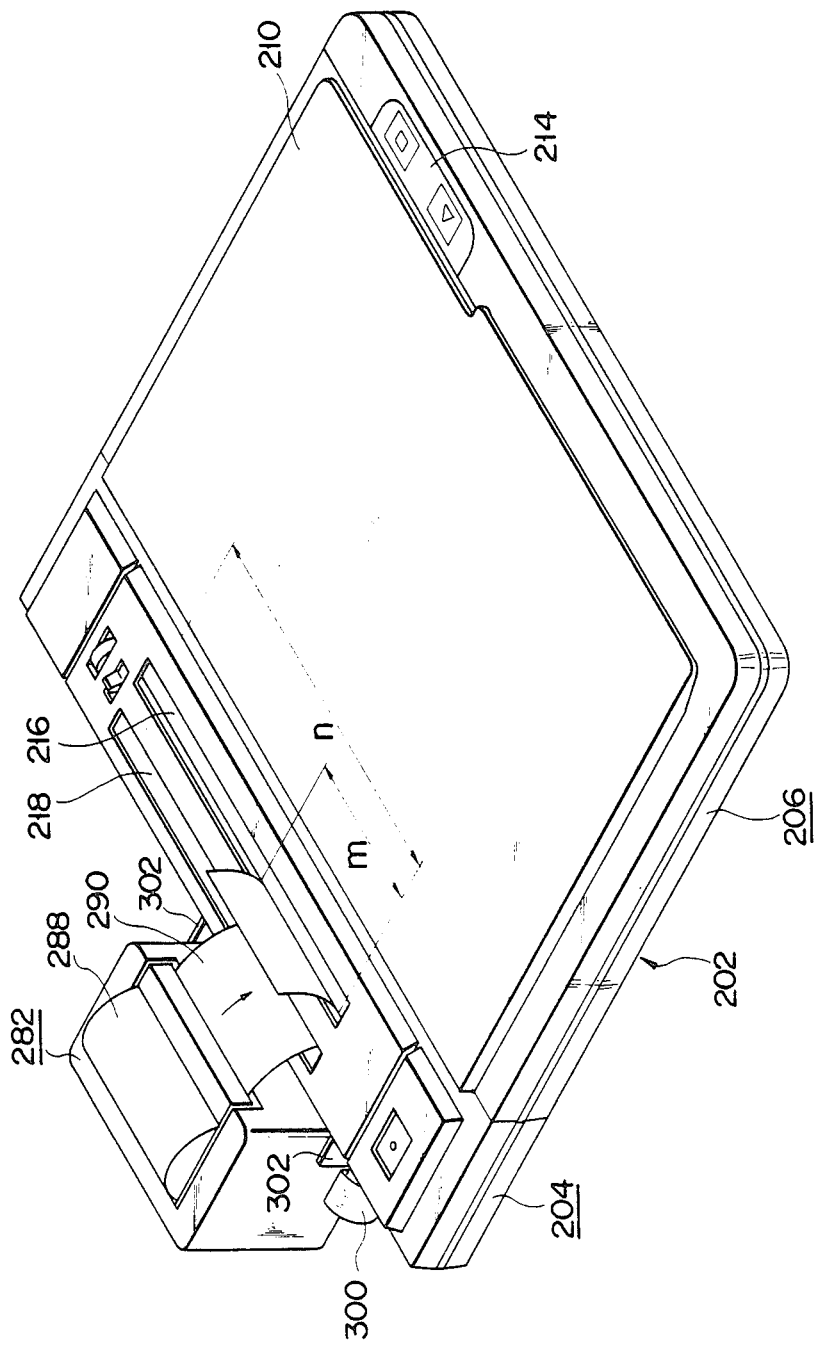

A pair of positioning guides 302 are arranged at the rear side of printer unit 204 to be pivotal in the direction indicated by arrows, as shown in FIG. 30, so that they can be housed in printer unit 204. As shown in FIG. 31, when additional unit 282 is set with reference to positioning guides 302, the print start position of printer 12 and the position of roll sheet 290 can be correctly aligned. When image data from television monitor 284 is printed out, since the resultant image is small in terms of resolution, width m of roll sheet 290 is smaller than image formation width n of printer 12.

Figure 32:
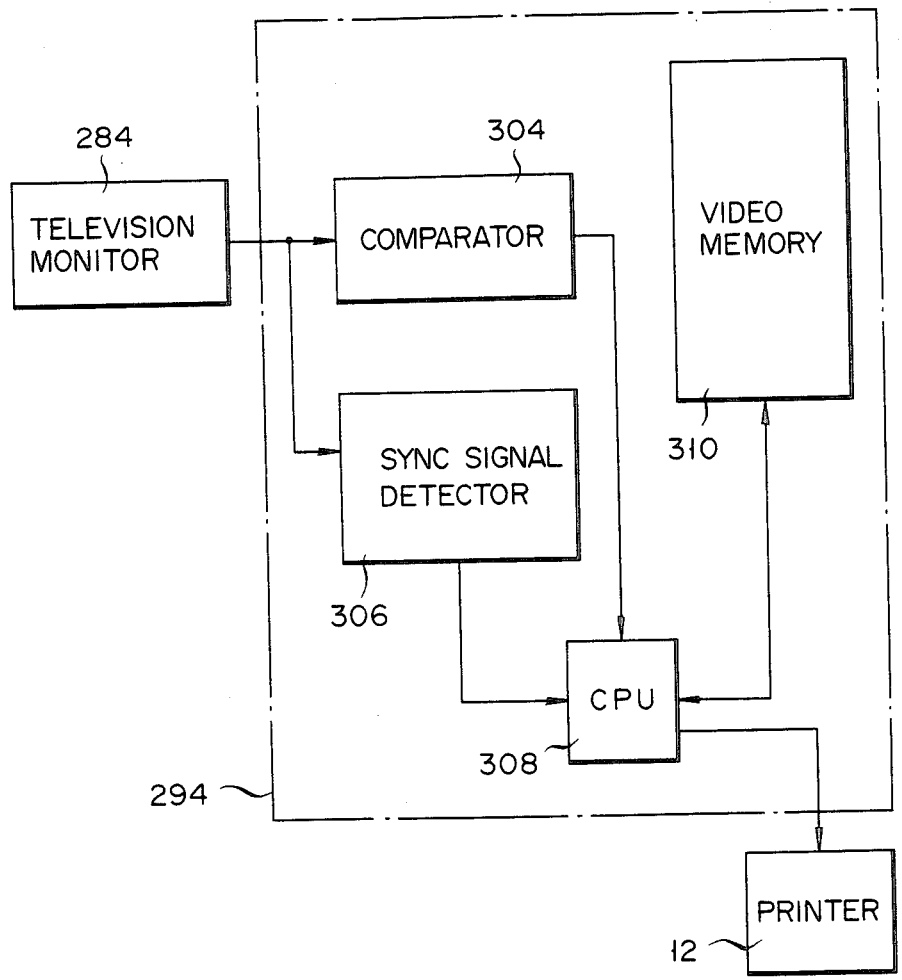
Figure 33:
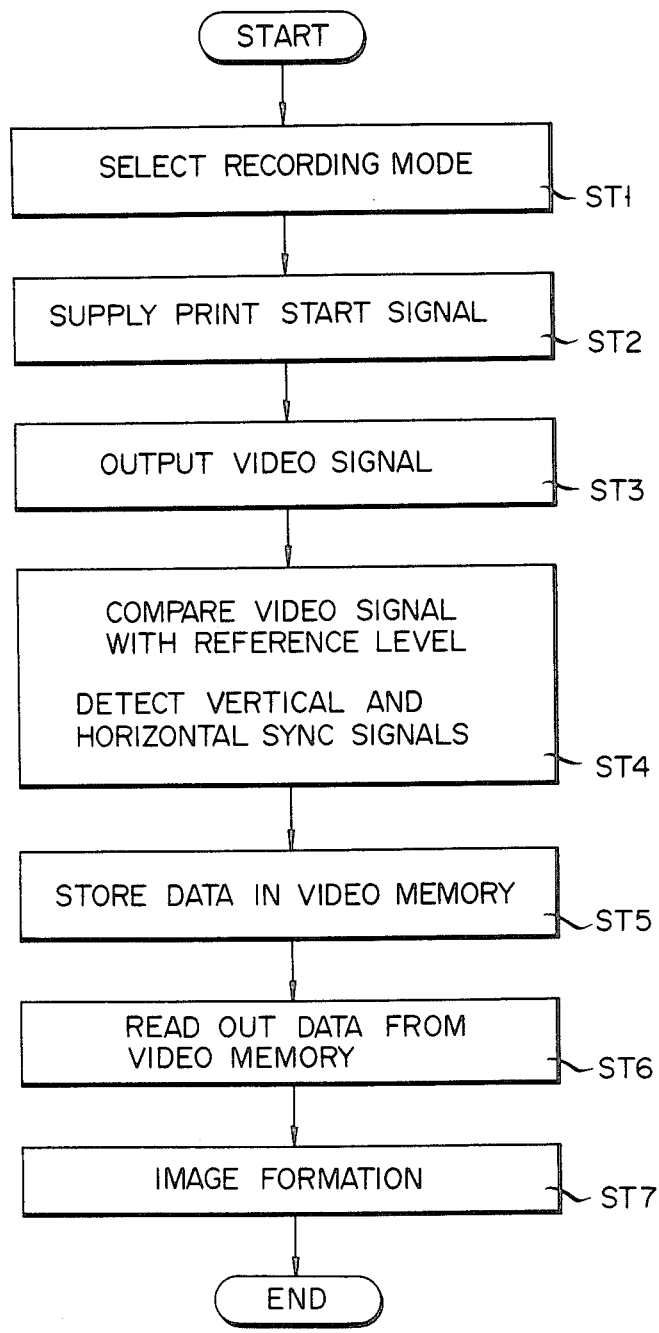
Figure 35:
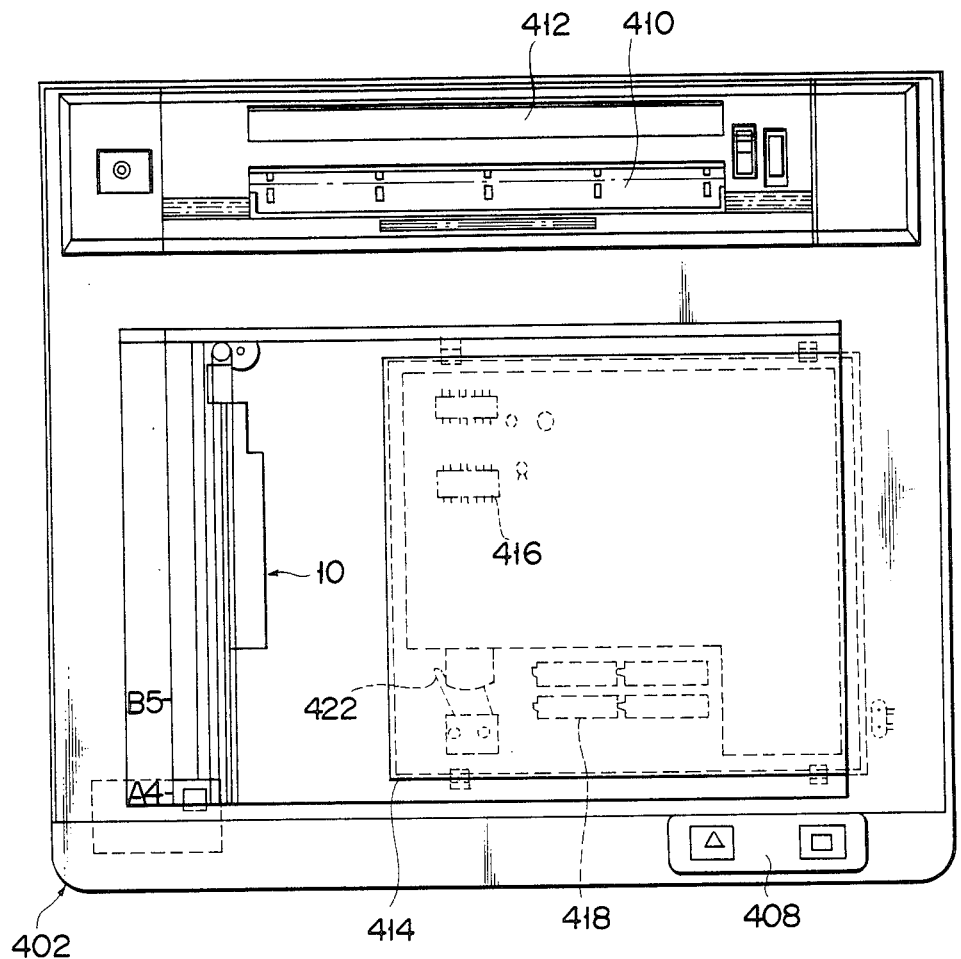
Figure 36:
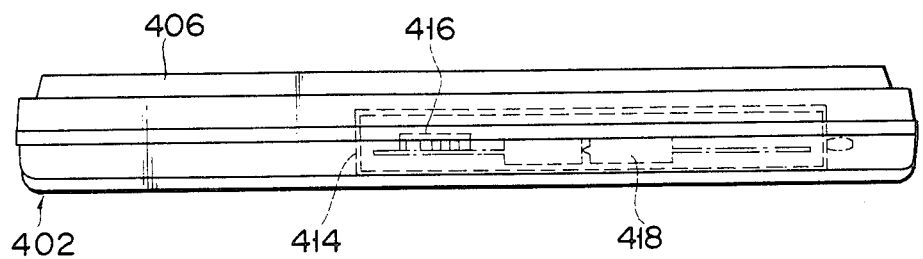

Interface circuit 294 has comparator 304, sync signal detector 306, CPU 308, and video memory 310, as shown in FIG. 32. Comparator 304 compares the video signal supplied from television monitor 284 with a reference level, and supplies the comparison result to CPU 308. Sync signal detector 306 separates horizontal and vertical sync signals from the video signal from television monitor 284, and supplies them to CPU 308. CPU 308 converts the analog signal from comparator 304 into a digital signal, and temporarily stores it in video memory 310 together with the signals from detector 306. CPU 308 reads out the data stored in video memory 310, and supplies it to printer 12. As shown in FIG. 33, when an operator depresses a mode switching button (not shown) of operation panel 214, the control is switched from a mode for printing out the scanned data from scanner 10 to a mode for printing out the image from television monitor 284 (ST1). When the operator depresses a copy start key (not shown) of operation panel 214, the copying operation is started (ST2). Thus, the video signal is output from television monitor 284, and is supplied to comparator 304 and sync signal detector 306 (ST3). In comparator 304, the video signal from television monitor 284 is compared with the reference signal, and the comparison result is supplied to CPU 308. In sync signal detector 306, the vertical and horizontal sync signals are detected from the video signal from television monitor 284, and these signals are supplied to CPU 308 (ST4). CPU 308 converts the analog signal from comparator 304 into the digital signal, and temporarily stores it in video memory 310 together with the sync signals from detector 306 (ST5). The storage data is read out by CPU 308 for each frame of television images, and is supplied to printer 12 (ST6). In printer 12, an image is formed on roll sheet 290 based on the data signal supplied from CPU 308 (ST7).

With this modification, since roll sheet 290 corresponding to the image size of television monitor 284 is used, a cumbersome paper setting operation can be omitted. In addition, since interface circuit 294 and roll sheet 290 are provided in additional unit 282, this provides good appearance, easy handling, and a compact apparatus.

A third embodiment of the present invention will now be described with reference to FIGS. 34 to 43.

Referring to FIG. 34, reference numeral 402 denotes a main body of a serial scanner printer as an image forming apparatus according to the present invention. Document table (transparent glass) 404 is arranged on the upper surface portion of main body 402, and document cover 406 is arranged thereon. The rear portion of document cover 406 is axially supported by a supporting shaft (not shown) to be pivotal thereabout. Thus, document cover 406 is openable and closeable with respect to document table 404. Operation panel 408 for performing a copying operation is arranged on the upper front surface of main body 402.

Main body 402 includes scanner 10 and printer 12. Note that since scanner 10 and printer 12 have the same arrangement as that of the first embodiment, the same reference numerals in this embodiment denote the same parts as in the first embodiment, and a detailed description thereof will be omitted.

Inlet port 410 and outlet port 412 for paper sheets (e.g., heat sensitive sheets) for printer 12 are formed in the upper rear surface of main body 402.

As shown in FIGS. 34 to 37, the moving area of first carriage 42 of scanner 10 provides a space when scanner 10 is not used, and this space can store detachable unit 414. Detachable unit 414 houses printed circuit board 416 constituting a control circuit, power source (dry cells or battery) 418, and the like. When scanner 10 is not used, detachable unit 414 is stored in the moving area from the bottom portion of main body 402, and is held by moving slide lock 420 in the direction of arrows in FIG. 37. As shown in FIG. 38, when scanner 10 is to be used, slide lock 420 is released, detachable unit 414 is removed from main body 402, and connector 422 of detachable unit 414 is connected to a connector (not shown) of main body 402. Note that connector 422 is housed inside detachable unit 414 through opening 424 (FIG. 38). Reference numeral 426 denotes a lid for opening and closing opening 424.

With this arrangement, since detachable unit 414 housing circuit board 416 and power source 418 is removed from main body 402 when scanner 10 is used and is housed in the moving area of scanner 10 when it is not used, available space can be effectively used, resulting in a compact apparatus and high portability.

FIGS. 39 to 43 show a modification of the third embodiment.

Figure 39:
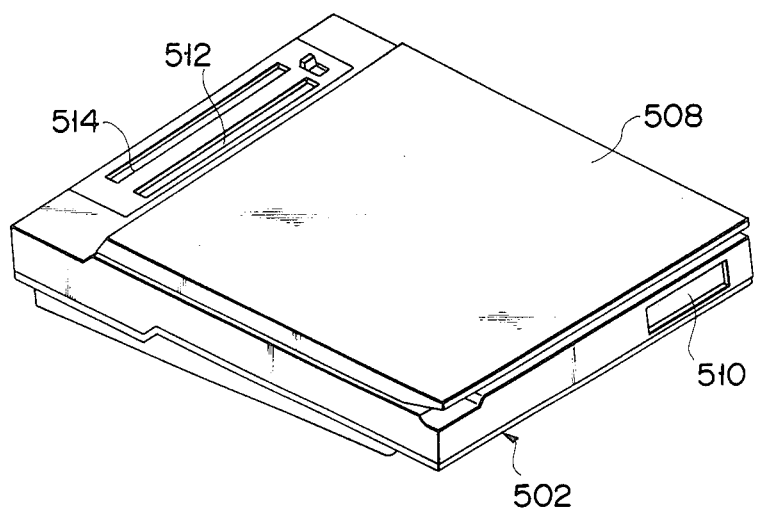
Figure 40:
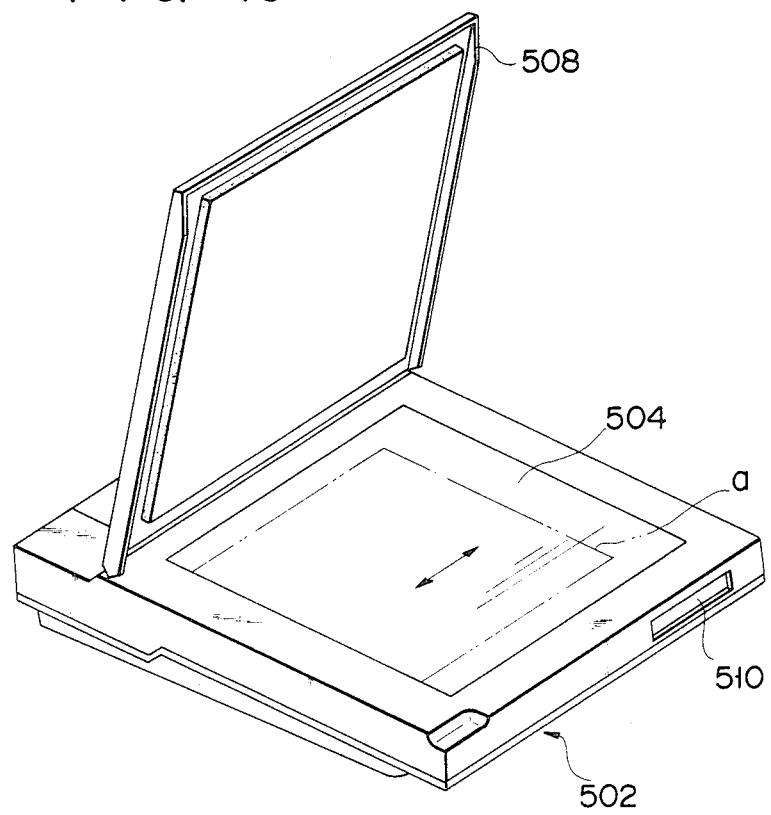
Figure 41:
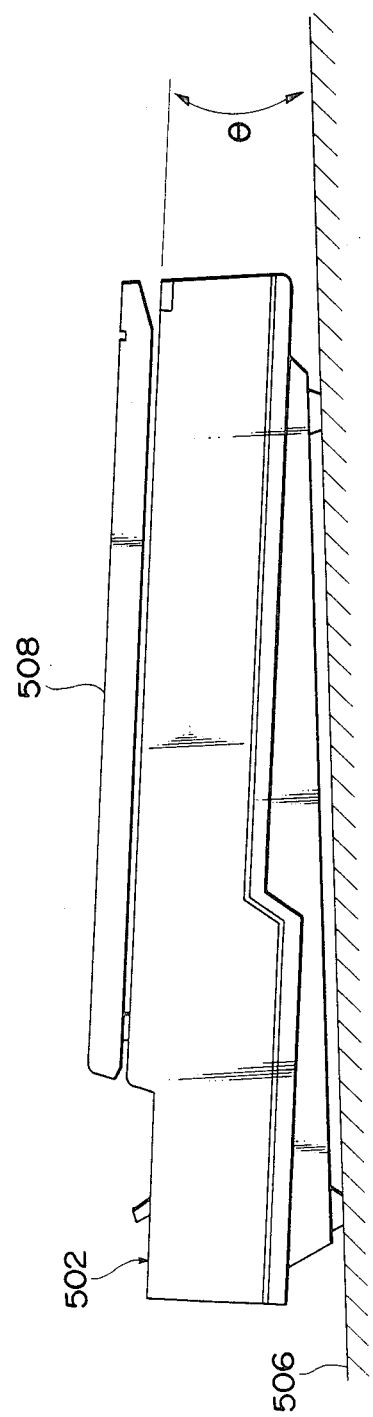

FIGS. 39 to 41 show a line scanner printer as an image forming apparatus according to the present invention. Reference numeral 502 denotes a main body of the apparatus. Document table 504 for placing document a thereon is arranged on the upper surface portion of main body 502, and is inclined downward toward an operator. More specifically, document table 504 is inclined downward through 8 degrees with respect to horizontal plane 506. Document cover 508 is arranged on document table 504. The rear portion of document cover 508 is axially supported by a supporting shaft (not shown) to be pivotal thereabout. Thus, document cover 508 is openable and closeable with respect to document table 504. Operation panel 510 for performing a copying operation is arranged on the front surface of main body 502. Inlet port 512 and outlet port 514 for paper sheets (e.g., heat sensitive sheets) for printer 516 are formed in the upper rear surface of main body 502.

As shown in FIG. 42, main body 502 houses scanner 518 for scanning an image formed on document a placed on document table 504, and printer 516 for forming an image on paper sheet p in accordance with the scanned data from scanner 518. Scanner 518 is arranged below document table 504, and printer 516 is arranged behind scanner 518.

Scanner 518 has first and second units 520 and 522, as shown in FIGS. 42 and 43. First unit 520 has LED array 524 and first mirror 526, and second unit 522 has second and third mirrors 528 and 530. First and second units 520 and 522 are respectively supported by front guide rail 532 and rear guide rail 534 at their front and rear end portions, and are movable along the direction indicated by the arrow in FIG. 40 through a drive means (not shown). The height of rear guide rail 534 is larger than that of front guide rail 532, so that first and second units 520 and 522 are supported by guide rails 532 and 534 while they are inclined downward in a direction perpendicular to their moving direction, i.e., they are held to be parallel to document table 504. Engaging chips 536 extend from the rear end portions of first and second units 520 and 522, and are engaged with rear guide rail 534. Thereby, the movement of first and second units 520 and 522 caused by force component F of weight G toward the inclined lower end is restricted. In addition, casing 538 is arranged in one side portion of main body 502 to house lens 540, CCD 542, and the like.

When the image formed on document a is to be scanned, LED array 524 illuminates document a, and first and second units 520 and 522 are moved along guide rails 532 and 534, thereby scanning the overall surface of document a. During the scanning operation, light reflected by document a is focused onto CCD 542 through lens 540, and the image formed on document a is thus read. Note that in order to provide a constant optical path length between first mirror 526 and lens 540, second unit 522 is moved at a speed ½ that of first unit 520.

When scanner 518 is not used, detachable unit 544 storing a control circuit and a power source is housed, in the moving area of first and second units 520 and 522, in the same manner as in the third embodiment.

Printer 516 comprises platen 546, for conveying and supporting paper sheet p, and thermal head 548 approaching and separating from platen 546. Thermal head 548 is heated in accordance with image scanning data from CCD 542, and forms an image on paper sheet p.

During the image scanning operation, first and second units 520 and 522 tend to swing in the back-and-forth direction during traveling. However, as described above, first and second units 520 and 522 are inclined downwardly toward the operator, and engaging chips 536 are engaged with guide rail 534 at their rear end portions. For this reason, the backward swinging of first and second units 520 and 522 is restricted by the force of their weight, which causes them to move forward. For the same reason, the forward swinging of units 520 and 522 is restricted by engaging chips 536 engaged with guide rail 534. Therefore, the swinging of first and second units 520 and 522 in the back-and-forth direction can be reliably prevented, thus maintaining a high scanning precision.

Note that in this modification, since detachable unit 544 can be stored in the moving area of first and second units 520 and 522, a compact apparatus can be provided, just as in the above embodiments.

What is claimed is:

1. An image forming apparatus comprising:
a document table for placing a document thereon;
image scanning means for scanning an image formed on the document placed on said document table and outputting the scanned data;
document cover means for covering the document placed on said document table;
data input means, provided in said document cover means, for inputting predetermined data; and
image forming means for forming an image on an image forming member in accordance with at least one of the input data from said data input means and the scanned data from said image scanning means.

2. The apparatus according to claim 1, wherein
said data input means has operation keys for inputting operation data for operating said image scanning means and said image forming means; and
said image forming means forms the image in accordance with the input data from said operation keys and the scanned data from said image scanning means.

3. The apparatus according to claim 1, wherein
said image forming apparatus is connected to an external device for receiving, processing, and outputting data, said external device having display means for displaying the data, and storage means for storing the data and outputting the storage data;
said data input means has a keyboard for inputting data to said external device; and
said image forming means has a function for forming an image based on the data output from said external device.

4. The apparatus according to claim 1, wherein
said data input means has a keyboard for inputting data for creating a document, and display means for displaying the data input from said keyboard; and
said image forming means forming an image based on the data input from said keyboard.

* * * * *